(12) United States Patent
Matsuzawa et al.

(10) Patent No.: US 9,931,752 B2
(45) Date of Patent: Apr. 3, 2018

(54) FORCE DETECTOR AND ROBOT

(71) Applicant: Seiko Epson Corporation, Tokyo (JP)

(72) Inventors: Akira Matsuzawa, Shiojiri (JP);
Toshiyuki Kamiya, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/284,842

(22) Filed: Oct. 4, 2016

(65) Prior Publication Data

US 2017/0021504 A1    Jan. 26, 2017

Related U.S. Application Data

(63) Continuation of application No. 14/624,882, filed on Feb. 18, 2015, now Pat. No. 9,481,089.

(30) Foreign Application Priority Data

Feb. 27, 2014  (JP) ................................ 2014-036417

(51) Int. Cl.
| | |
|---|---|
| G01L 1/00 | (2006.01) |
| B25J 9/16 | (2006.01) |
| G01L 1/16 | (2006.01) |
| G01L 5/16 | (2006.01) |
| G01L 5/00 | (2006.01) |
| B25J 13/08 | (2006.01) |

(52) U.S. Cl.
CPC ........... *B25J 9/1694* (2013.01); *B25J 13/085* (2013.01); *G01L 1/16* (2013.01); *G01L 5/009* (2013.01); *G01L 5/167* (2013.01)

(58) Field of Classification Search
CPC .. G01L 1/16; G01L 5/167; G01L 5/009; B25J 13/085; B25J 9/1694

USPC ...................................................... 73/862.381
See application file for complete search history.

(56) References Cited

U.S. PATENT DOCUMENTS

| | | | |
|---|---|---|---|
| 3,722,286 A | 3/1973 | Weber | |
| 4,215,570 A | 8/1980 | Eer Nisse | |
| 4,404,539 A * | 9/1983 | Yamada | ................ G01L 9/0054 338/3 |
| 5,068,635 A | 11/1991 | Yajima | |

(Continued)

FOREIGN PATENT DOCUMENTS

| | | |
|---|---|---|
| JP | 2011-043442 A | 3/2011 |
| JP | 3168179 U | 5/2011 |

(Continued)

*Primary Examiner* — Max Noori
(74) *Attorney, Agent, or Firm* — Harness, Dickey & Pierce, P.L.C.

(57) ABSTRACT

A force detector includes a first base part, a second base part, and a pressure detection unit provided between the first base part and the second base part and including a piezoelectric element that outputs a signal in response to an external force, wherein the pressure detection unit has a first member having a portion in contact with the first base part, a second member having a portion in contact with the second base part, and a third member connecting the first member and the second member, a first longitudinal elastic modulus of at least a part of the first member is lower than a third longitudinal elastic modulus of the third member, and a second longitudinal elastic modulus of at least a part of the second member is lower than the third longitudinal elastic modulus of the third member.

21 Claims, 11 Drawing Sheets

(56) References Cited

U.S. PATENT DOCUMENTS

| | | | |
|---|---|---|---|
| 6,487,911 B1* | 12/2002 | Frackelton | G01L 9/0075 |
| | | | 73/714 |
| 8,627,909 B2 | 1/2014 | Chang et al. | |
| 8,813,347 B2 | 8/2014 | Menassa et al. | |
| 8,887,582 B2 | 11/2014 | Suzuki | |
| 9,091,607 B2* | 7/2015 | Matsumoto | B25J 19/028 |
| 2002/0194932 A1* | 12/2002 | Gysling | G01F 1/34 |
| | | | 73/861.42 |
| 2011/0107850 A1* | 5/2011 | Kim | G01L 5/16 |
| | | | 73/862.041 |
| 2013/0008263 A1* | 1/2013 | Kabasawa | G01F 1/383 |
| | | | 73/861.42 |
| 2013/0152700 A1 | 6/2013 | Kamiya et al. | |
| 2013/0233089 A1 | 9/2013 | Kawai et al. | |
| 2015/0120052 A1* | 4/2015 | Mizushima | G01L 1/16 |
| | | | 700/258 |
| 2015/0127159 A1* | 5/2015 | Kamiya | G01P 15/18 |
| | | | 700/258 |
| 2016/0109311 A1* | 4/2016 | Inazumi | G01L 5/167 |
| | | | 73/862.042 |

FOREIGN PATENT DOCUMENTS

| | | |
|---|---|---|
| JP | 2011-185681 A | 9/2011 |
| JP | 2013-130431 A | 7/2013 |
| JP | 2013-130433 A | 7/2013 |
| JP | 2013-186030 A | 9/2013 |

\* cited by examiner

FORCE DETECTOR AND ROBOT

CROSS-REFERENCE TO RELATED APPLICATIONS

This is a continuation patent application of U.S. application Ser. No. 14/624,882 filed Feb. 18, 2015, which claims priority to Japanese Patent Application No. 2014-036417 filed on Feb. 27, 2014, both of which are expressly incorporated by reference herein in their entireties.

BACKGROUND

1. Technical Field

The present invention relates to a force detector and a robot.

2. Related Art

Recently, introduction of industrial robots to production facilities including factories has been promoted for improvement in production efficiency. As the industrial robots, machine tools for machining parent materials such as aluminum boards are representative. Some machine tools include force detectors that detect forces on the parent materials at machining (for example, see Patent Document 1 (JP-2013-130431)).

Patent Document 1 discloses a sensor device including a piezoelectric element, a ceramic package having a recessed part for housing the piezoelectric element, and a lid joined to the ceramic package to close the opening of the recessed part with the piezoelectric element housed within the recessed part of the ceramic package. Further, the sensor device is sandwiched by two pressurization plates.

In the sensor device, when an external force is applied to the pressurization plate, the external force is transmitted to the piezoelectric element via the ceramic package and the lid, the piezoelectric element outputs electric charge in response to the external force, and thereby, the applied external force may be detected based on the electric charge.

Further, the sensor device is air-tightly sealed by the ceramic package and the lid and shielded from outside air. Thereby, the electric charge generated from the piezoelectric element is prevented from unintendedly leaking to the outside due to moisture or the like.

However, in the force detector disclosed in Patent Document 1, there is a problem that external forces are repeatedly applied to the pressurization plates, and thereby, stress is repeatedly applied to the ceramic package and the ceramic package is broken. Accordingly, it is difficult to use the force detector stably over a long period.

Further, in the force detector, there is another problem that, at manufacturing, when the sensor device is sandwiched by the pressurization plates, the ceramic package is broken due to the pressure applied by the pressurization plates.

SUMMARY

Accordingly, an advantage of some aspects of the invention is to provide a force detector that may reduce breakage of a housing part (package) housing a piezoelectric element even when external forces are repeatedly applied, and a robot.

The advantage is achieved by the following aspects or application examples of the invention.

APPLICATION EXAMPLE 1

A force detector according to this application example of the invention includes a first base part, a second base part, and a pressure detection unit provided between the first base part and the second base part and including a piezoelectric element that outputs a signal in response to an external force, wherein the pressure detection unit has a first member having a portion in contact with the first base part, a second member having a portion in contact with the second base part, and a third member connecting the first member and the second member, a first longitudinal elastic modulus of at least a part of the first member is lower than a third longitudinal elastic modulus of the third member, and a second longitudinal elastic modulus of at least a part of the second member is lower than the third longitudinal elastic modulus of the third member.

With this configuration, even when external forces are repeatedly applied to the first base part and the second base part, the first member and the second member may be deformed in response to the external forces. Accordingly, even when external forces are repeatedly applied, breakage of a housing part housing the piezoelectric element may be reduced.

APPLICATION EXAMPLE 2

In the force detector according to this application example of the invention, it is preferable that a difference between the first longitudinal elastic modulus and the second longitudinal elastic modulus is a tenth part or less of the first longitudinal elastic modulus.

With this configuration, concentration of stress on only one of the first member and the second member may be avoided, and therefore, breakage of the housing part housing the piezoelectric element may be reduced more reliably.

APPLICATION EXAMPLE 3

In the force detector according to this application example of the invention, it is preferable that a constituent material of the first member and a constituent material of the second member are the same.

With this configuration, concentration of the applied external force on only one of the first member and the second member may be avoided, and therefore, unintended deformation and breakage of the housing part housing the piezoelectric element may be reduced particularly effectively.

APPLICATION EXAMPLE 4

In the force detector according to this application example of the invention, it is preferable that a constituent material of the third member contains ceramic.

With this configuration, the mechanical strength as the whole housing part may be sufficiently secured. Therefore, even when external forces are repeatedly applied thereto, damage by the deformation of the housing part is harder to be caused, and the piezoelectric element housed inside may be protected more reliably.

APPLICATION EXAMPLE 5

In the force detector according to this application example of the invention, it is preferable that the longitudinal elastic modulus of the first member is the first longitudinal elastic modulus.

With this configuration, the first member may be formed by a single member and a single material, and the longitudinal elastic modulus (Young modulus) and the mechanical strength may be homogenized over the whole first member. Accordingly, breakage of the first member due to the applied external force may be reduced more reliably, and the external force may be transmitted to the piezoelectric element via the first member more accurately.

APPLICATION EXAMPLE 6

In the force detector according to this application example of the invention, it is preferable that the longitudinal elastic modulus of the second member is the second longitudinal elastic modulus.

With this configuration, the second member may be formed by a single member and a single material, and the longitudinal elastic modulus (Young modulus) and the mechanical strength may be homogenized over the whole second member. Accordingly, breakage of the second member due to the applied external force may be reduced more reliably, and the external force may be transmitted to the piezoelectric element via the second member more accurately.

APPLICATION EXAMPLE 7

In the force detector according to this application example of the invention, it is preferable that the piezoelectric element contains crystal.

With this configuration, the force detector is harder to be influenced by temperature variations, and therefore, may accurately detect the external force.

APPLICATION EXAMPLE 8

In the force detector according to this application example of the invention, it is preferable that the piezoelectric element is located inside of the pressure detection unit.

With this configuration, the piezoelectric element is sealed and shielded from outside air, and therefore, output electric charge is prevented from unintendedly leaking due to moisture or the like.

APPLICATION EXAMPLE 9

A robot according to this application example of the invention includes an arm, an end effector provided on the arm, and a force detector provided between the arm and the end effector and detecting an external force applied to the end effector, the force detector includes a first base part, a second base part, and a pressure detection unit provided between the first base part and the second base part and including a piezoelectric element that outputs a signal in response to an external force, wherein the pressure detection unit has a first member having a portion in contact with the first base part, a second member having a portion in contact with the second base part, and a third member connecting the first member and the second member, a first longitudinal elastic modulus of at least a part of the first member is lower than a third longitudinal elastic modulus of the third member, and a second longitudinal elastic modulus of at least a part of the second member is lower than the third longitudinal elastic modulus of the third member.

With this configuration, in the robot, even when external forces are repeatedly applied to the pressure detection unit, breakage of the housing part housing the piezoelectric element may be reduced. Therefore, according to the robot, the external forces may be accurately detected and work by the end effector may be properly performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, preferred embodiments of the invention will be explained in detail.

1. Force Detector

Figure 1:
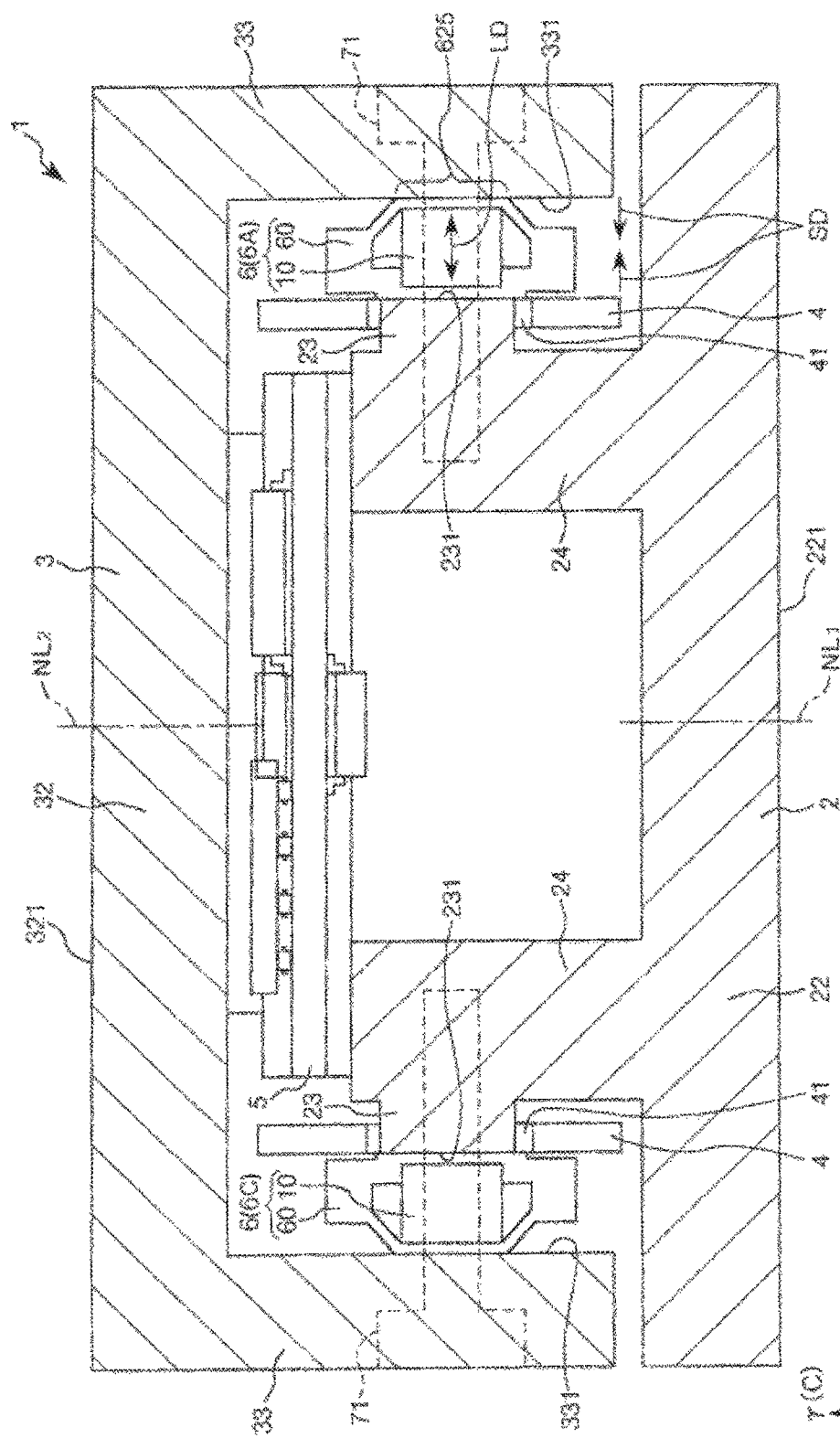
FIG. 1 is a sectional view showing a force detector according to a first embodiment of the invention.
Figure 2:
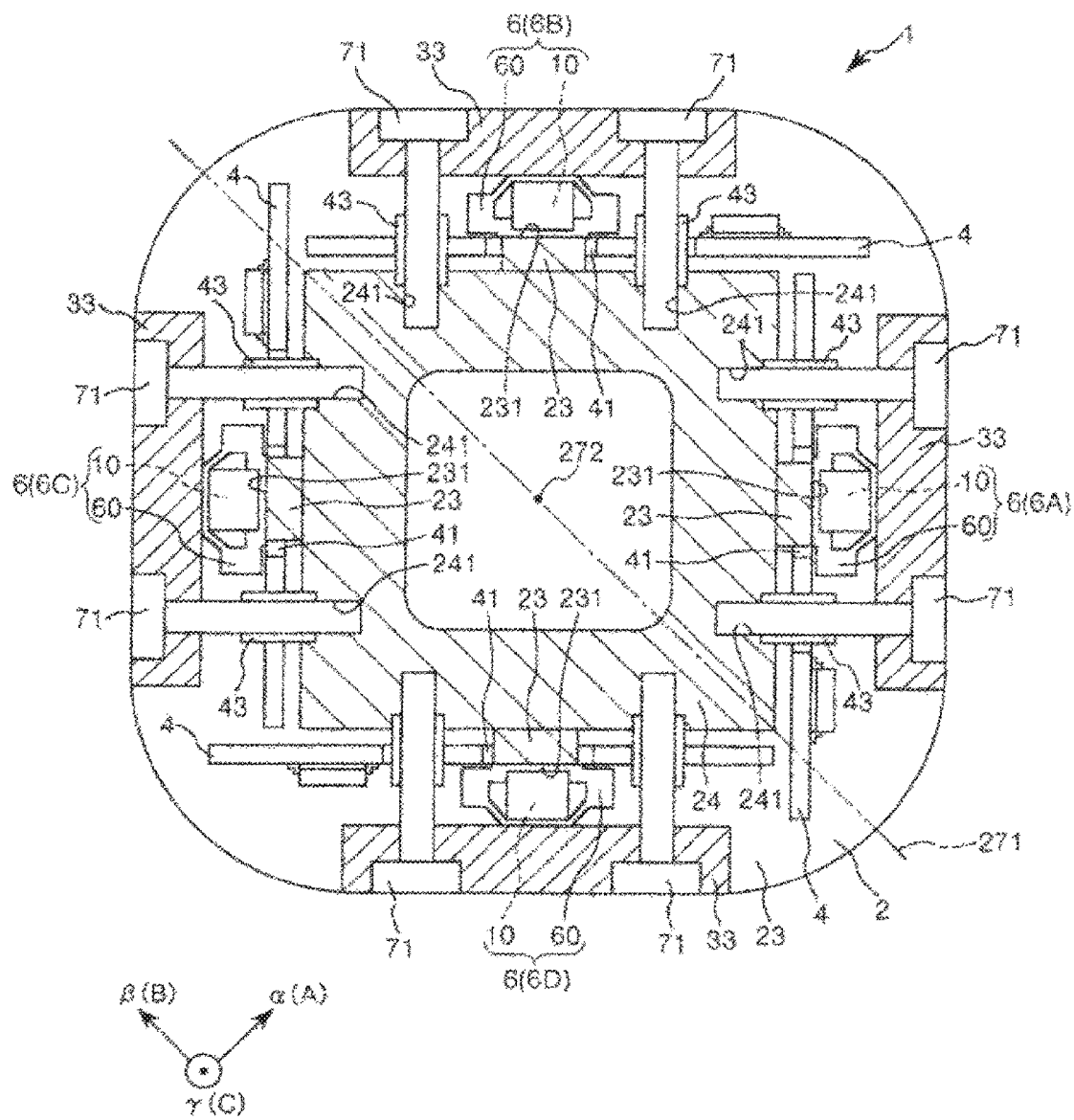
FIG. 2 is a plan view of the force detector shown in FIG. 1.
Figure 3:
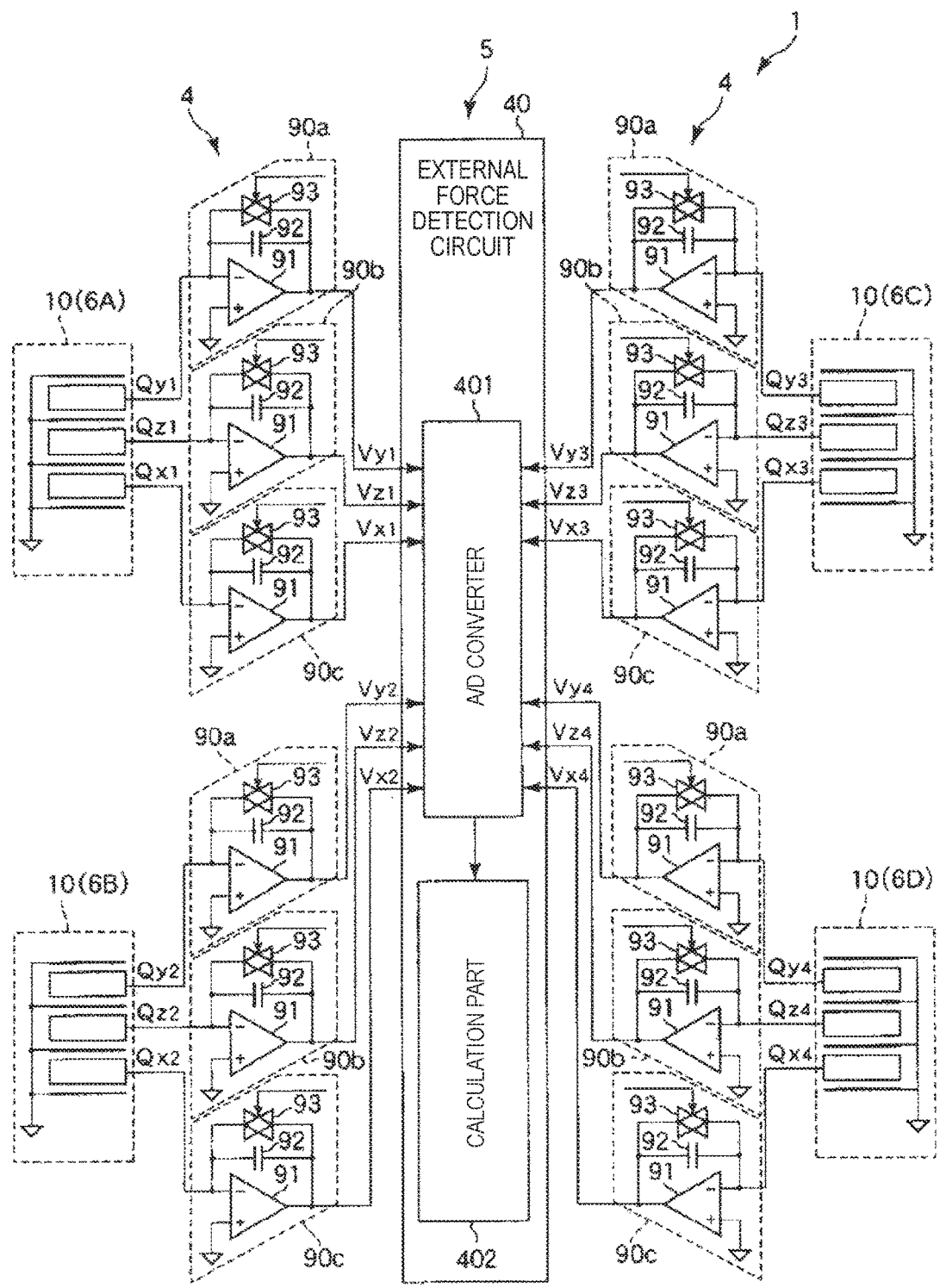
FIG. 3 is a circuit diagram schematically showing the force detector shown in FIG. 1.
Figure 4:
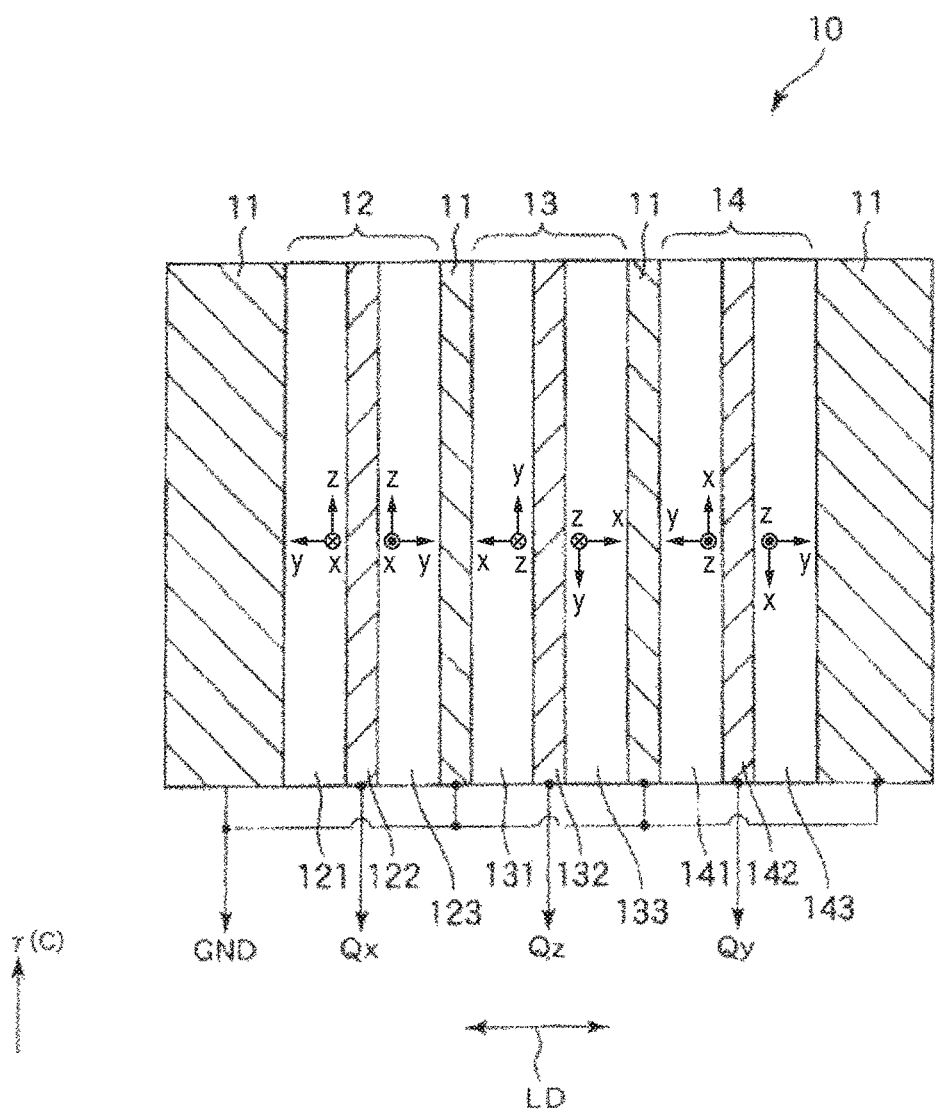
FIG. 4 is a sectional view schematically showing a charge output element provided in the force detector shown in FIG. 1.
Figure 5:
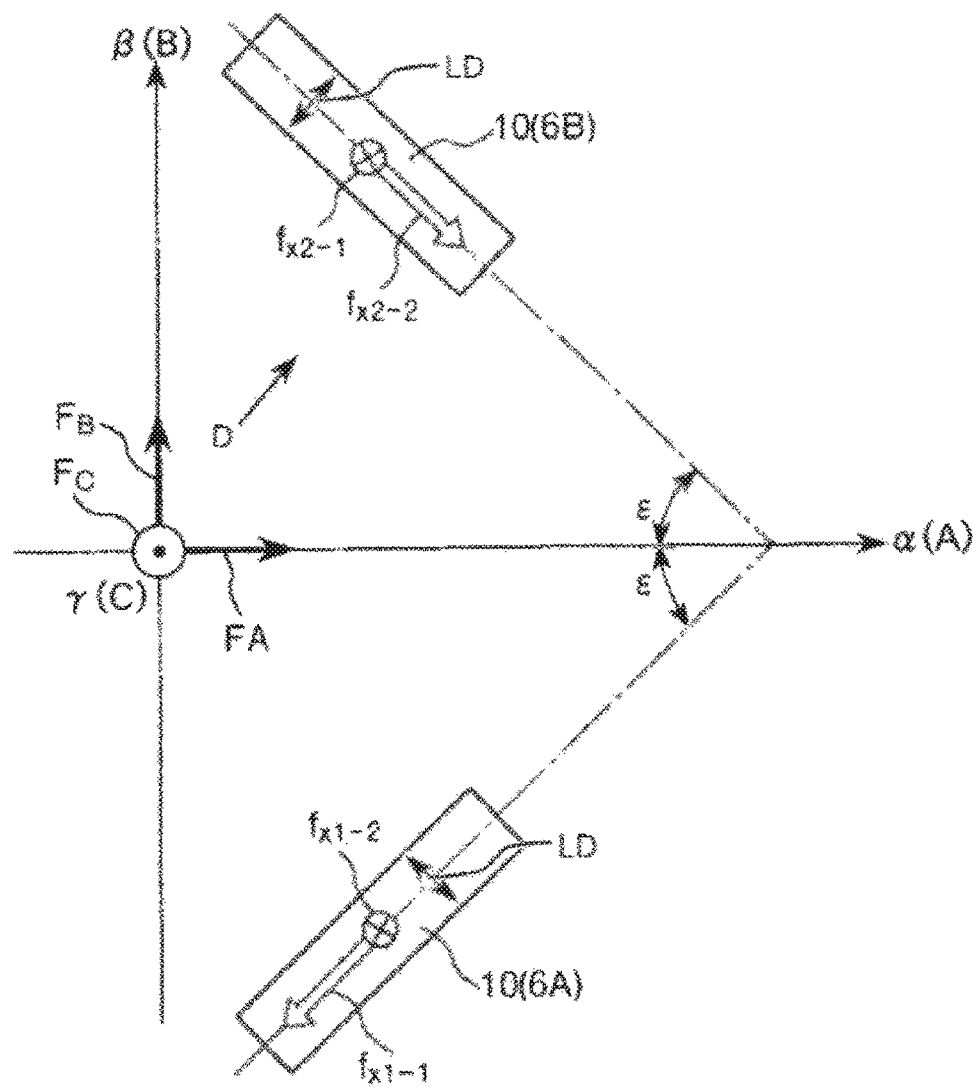
FIG. 5 is a schematic diagram showing an acting state of a force detected by the charge output element of the force detector shown in FIG. 1.
Figure 6:
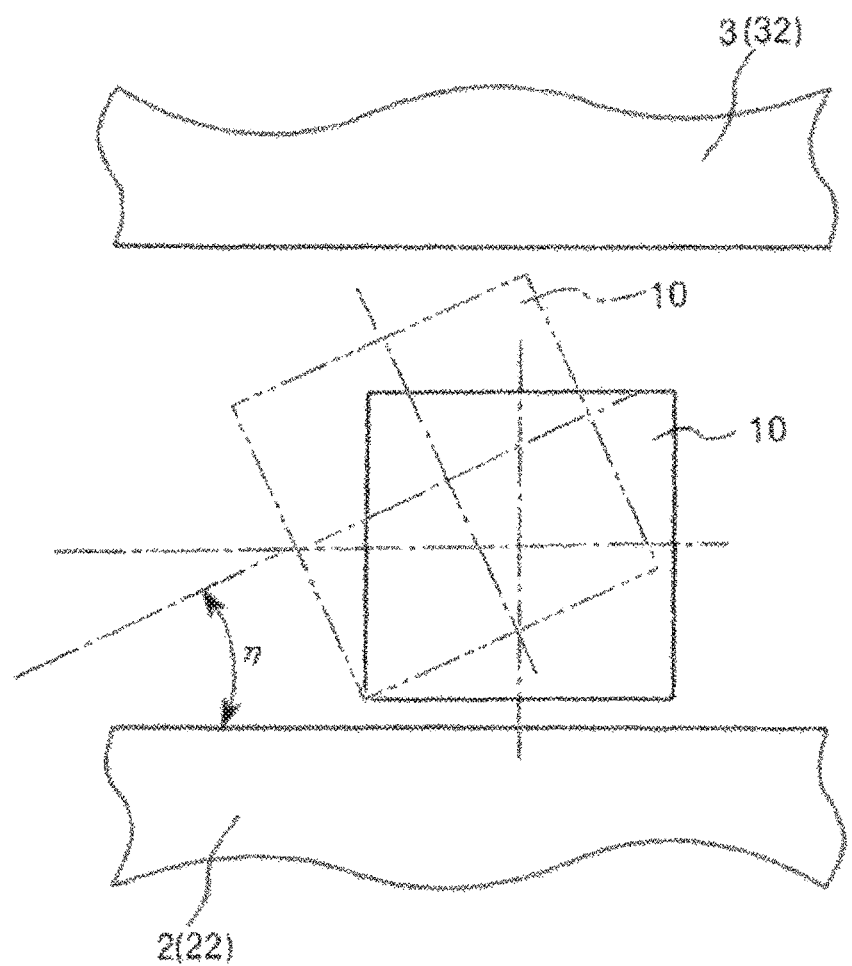
FIG. 6 is a diagram as seen from an arrow D in FIG. 5.
Figure 7:
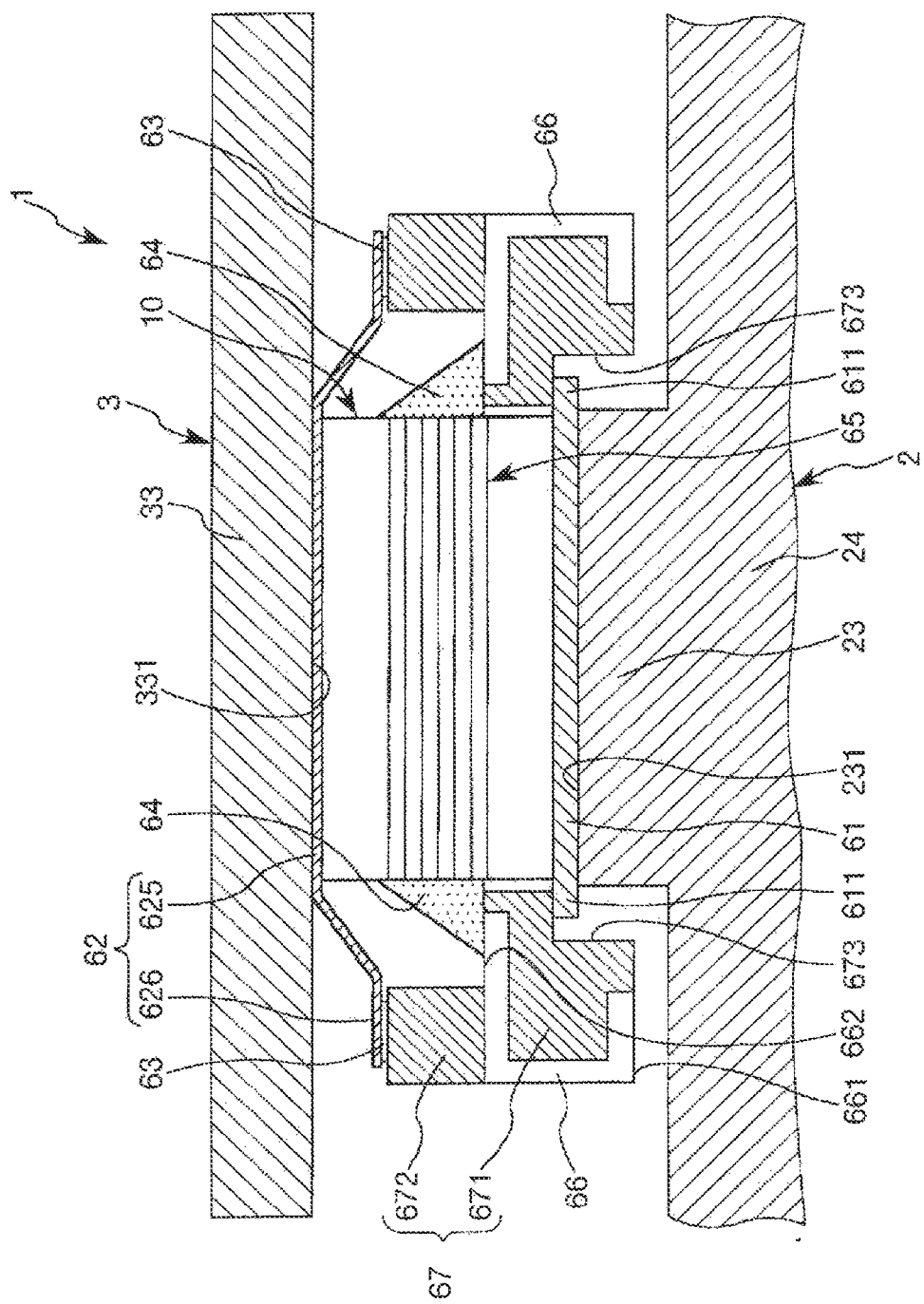
FIG. 7 is a partially enlarged detail view around the charge output element of the force detector shown in FIG. 1.

FIG. 1 is a sectional view showing a force detector according to a first embodiment of the invention, FIG. 2 is a plan view of the force detector shown in FIG. 1, FIG. 3 is a circuit diagram schematically showing the force detector shown in FIG. 1, FIG. 4 is a sectional view schematically showing a charge output element provided in the force detector shown in FIG. 1, FIG. 5 isaschematic diagram showing an acting state of a force detected by the charge output element of the force detector shown in FIG. 1, FIG. 6 is a diagram as seen from an arrow D in FIG. 5, and FIG. 7 is a partially enlarged detail view around the charge output element of the force detector shown in FIG. 1.

Note that, as below, the upside in FIG. 1 is referred to as "upper" or "above" and the downside is referred to as "lower" or "below".

In FIGS. 2 and 5, as three axes orthogonal to one another, an α-axis, a β-axis, and a γ-axis are shown. Further, in FIGS. 1 and 4, of the three axes, only the γ-axis is shown. A direction in parallel to the α(A)-axis is referred to as "α(A)-axis direction", a direction in parallel to the β(B)-axis is referred to as "β(B)-axis direction", and a direction in parallel to the γ(C)-axis is referred to as "γ(C)-axis direction". A plane defined by the α-axis and the β-axis is referred to as "αβ-plane", a plane defined by the β-axis and the γ-axis is referred to as "αγ-plane", and a plane defined by the α-axis and the γ-axis is referred to as "αγ-plane". A direction in parallel to the α-axis is referred to as "α direction", a direction in parallel to the β-axis is referred to as "β direction", and a direction in parallel to the γ-axis is referred to as "γ direction". Further, in the α direction, the β direction, and the γ direction, the pointing end side of an arrow is referred to as "+ (positive) side" and the base end side of the arrow is referred to as "− (negative) side".

A force detector 1 shown in FIG. 1 has a function of detecting external forces applied to the force detector 1, i.e., six-axis forces (translational force components in the α-, β-, and γ-axis directions and rotational force components around the α-, β-, and γ-axes).

The force detector 1 includes a first base part (base part) 2, a second base part (base part) 3 provided at a predetermined distance from the first base part 2 and opposed to the first base part 2, analog circuit boards 4 housed (provided) between the first base part 2 and the second base part 3, a digital circuit board 5 housed (provided) between the first base part 2 and the second base part 3 and electrically connected to the analog circuit boards 4, four sensor devices (pressure detection units) 6 mounted on the analog circuit boards 4 and having charge output elements (piezoelectric elements) 10 that output signals in response to external forces and packages (housing parts) 60 that house the charge output elements 10, and eight pressurization bolts (fixing members) 71.

As below, configurations of the respective parts of the force detector 1 will be described in detail.

Note that, in the following explanation, as shown in FIG. 2, of the four sensor devices 6, the sensor device 6 located on the right side in FIG. 2 is referred to as "sensor device 6A", and, sequentially in the counter-clockwise direction, the sensor devices are referred to as "sensor device 6B", "sensor device 6C", and "sensor device 6D".

As shown in FIG. 1, the first base part (base plate) 2 has a plate-like outer shape, and a rounded rectangular planar shape. The planar shape of the first base part 2 is not limited to the shown shape, but may be a circular shape or another polygonal shape than the rectangular shape, for example.

A lower surface 221 of the first base part 2 functions, when the force detector 1 is fixed to, e.g., a robot and used, as a mounting surface (first mounting surface) for the robot (measuring object).

The first base part 2 has a bottom plate 22 and wall parts 24 stood upward from the bottom plate 22.

The wall parts 24 have "L" shapes and convex portions 23 respectively formed on two surfaces facing outward to project. The top surfaces (first surfaces) 231 of the respective convex portions are flat surfaces perpendicular to the bottom plate 22. Further, in the convex portions 23, internal threads 241 screwed with the pressurization bolts 71, which will be described later, are provided (see FIG. 2).

As shown in FIG. 1, the second base part (cover plate) 3 is provided to be opposed to the first base part 2 at a predetermined distance.

The second base part 3 also has a plate-like outer shape like the first base part 2. Further, it is preferable that the planar shape of the second base part 3 is a shape corresponding to the planar shape of the first base part 2, and, in the embodiment, the plan view shape of the second base part 3 is a rectangular shape with rounded corners like the plan view shape of the first base part 2. Furthermore, it is preferable that the second base part 3 has a size containing the first base part 2.

An upper surface (second surface) 321 of the second base part 3 functions, when the force detector 1 is fixed to, e.g., a robot and used, as a mounting surface (second mounting surface) for an end effector (measuring object) attached to the robot. Further, the upper surface 321 of the second base part 3 and the above described lower surface 221 of the first base part 2 are in parallel under natural conditions without application of external forces.

The second base part 3 has a top plate 32 and side walls 33 formed on an edge part of the top plate 32 and projecting downward from the edge part. Inner wall surfaces (second surfaces) 331 of the side walls 33 are flat surfaces perpendicular to the top plate 32. Further, the sensor devices 6 are provided between the top surfaces 231 of the first base part 2 and the inner wall surfaces 331 of the second base part 3.

The first base part 2 and the second base part 3 are connected and fastened by the pressurization bolts 71. As shown in FIG. 2, there are eight (a plurality of) pressurization bolts 71 and two of them each are provided on both sides of the respective sensor devices 6. Note that the number of pressurization bolts 71 for each sensor device 6 is not limited to two, but may be three or more, for example.

Further, the constituent material of the pressurization bolts 71 is not particularly limited. For example, various resin materials, various metal materials, etc. may be used.

The first base part 2 and the second base part 3 connected by the pressurization bolts 71 form a housing space for housing the sensor devices 6A to 6D, the analog circuit boards 4, and the digital circuit board 5. The housing space has a sectional shape of circle or square with rounded corners.

As shown in FIG. 1, the analog circuit boards 4 connected to the sensor devices 6 are provided between the first base part 2 and the second base part 3.

In the parts of the analog circuit boards 4 in which the sensor devices 6 (specifically, the charge output elements 10) are provided, holes 41 for insertion of the respective convex portions 23 of the first base part 2 are formed. The holes 41 are through holes penetrating the analog circuit boards 4.

Further, as shown in FIG. 2, through holes penetrated by the respective pressurization bolts 71 are provided in the analog circuit boards 4, and pipes 43 formed using an insulating material of a resin material or the like are fixed to the parts penetrated by the respective pressurization bolts 71 of the analog circuit boards 4 (through holes) by fitting, for example.

Furthermore, as shown in FIG. 3, the analog circuit board 4 connected to the sensor device 6A includes a conversion output circuit 90a that converts electric charge Qy1 output from the charge output element 10 of the sensor device 6A into a voltage Vy1, a conversion output circuit 90b that converts electric charge Qz1 output from the charge output element 10 into a voltage Vz1, and a conversion output circuit 90c that converts electric charge Qx1 output from the charge output element 10 into a voltage Vx1.

The analog circuit board 4 connected to the sensor device 61B includes a conversion output circuit 90a that converts electric charge Qy2 output from the charge output element 10 of the sensor device 6B into a voltage Vy2, a conversion output circuit 90b that converts electric charge Qz2 output from the charge output element 10 into a voltage Vz2, and a conversion output circuit 90c that converts electric charge Qx2 output from the charge output element 10 into a voltage Vx2.

The analog circuit board 4 connected to the sensor device 6C includes a conversion output circuit 90a that converts electric charge Qy3 output from the charge output element 10 of the sensor device 6C into a voltage Vy3, a conversion output circuit 90b that converts electric charge Qz3 output from the charge output element 10 into a voltage Vz3, and a conversion output circuit 90c that converts electric charge Qx3 output from the charge output element 10 into a voltage Vx3.

The analog circuit board 4 connected to the sensor device 6D includes a conversion output circuit 90a that converts electric charge Qy4 output from the charge output element 10 of the sensor device 6D into a voltage Vy4, a conversion output circuit 90b that converts electric charge Qz4 output from the charge output element 10 into a voltage Vz4, and a conversion output circuit 90c that converts electric charge Qx4 output from the charge output element 10 into a voltage Vx4.

As shown in FIG. 1, the digital circuit board 5 connected to and supported by the analog circuit boards 4 is provided between the first base part 2 and the second base part 3 in a position different from the positions in which the analog circuit boards 4 are provided on the first base part 2. As shown in FIG. 3, the digital circuit board 5 includes an external force detection circuit 40 having an AD converter 401 connected to the conversion output circuits (conversion circuits) 90a, 90b, 90c and a calculation part (calculation circuit) 402 connected to the AD converter 401.

Note that the constituent materials of the first base part 2, the second base part 3, the other parts than the respective elements and the respective wires of the analog circuit boards 4, and the other parts than the respective elements and the respective wires of the digital circuit board 5 are not particularly limited. For example, various resin materials, various metal materials, etc. may be used.

Further, the first base part 2 and the second base part 3 are respectively formed by the members having the plate-like outer shapes, however, not limited to those. For example, one base part may be formed by a plate-like member and the other base part may be formed by a block-like member.

Next, the sensor devices 6 will be explained in detail.

Sensor Devices

As shown in FIGS. 1 and 2, the sensor device 6A is sandwiched by the top surface 231 of one convex portion 23 of the four convex portions 23 of the first base part 2 and the inner wall 331 opposed to the top surface 231. Like the sensor device 6A, the sensor device 6B is sandwiched by the top surface 231 of one convex portion 23 different from the portion and the inner wall 331 opposed to the top surface 231. Further, the sensor device 6C is sandwiched by the top surface 231 of one convex portion 23 different from the portion and the inner wall 331 opposed to the top surface 231. Furthermore, the sensor device 6D is sandwiched by the top surface 231 of one convex portion 23 different from the portion and the inner wall 331 opposed to the top surface 231.

Note that, as below, the directions in which the respective sensor devices 6A to 6D are sandwiched by the first base part 2 and the second base part 3 are referred to as "sandwich directions SD". Further, the direction in which the first sensor device 6A of the respective sensor devices 6A to 6D is sandwiched may be referred to as "first sandwich direction", the direction in which the second sensor device 6B is sandwiched may be referred to as "second sandwich direction", the direction in which the third sensor device 6C is sandwiched may be referred to as "third sandwich direction", and the direction in which the fourth sensor device 6D is sandwiched may be referred to as "fourth sandwich direction".

Note that, in the embodiment, as shown in FIG. 1, the sensor devices 6 are provided at the second base part 3 (side walls 33) side of the analog circuit boards 4, however, the sensor devices 6 may be provided at the first base part 2 side of the analog circuit boards 4.

Further, as shown in FIG. 2, the sensor device 6A and the sensor device 6B, the sensor device 6C and the sensor device 6D are symmetrically provided with respect to a center axis 271 along the β-axis of the first base part 2. That is, the sensor devices 6A to 6D are provided at equal angular intervals around a center 272 of the first base part 2. The sensor devices 6A to 6D are provided as described above, and thereby, external forces may be detected without deviation.

The arrangement of the sensor devices 6A to 6D is not limited to the illustrated one. It is preferable that the sensor devices 6A to 6D are provided in positions as far apart as possible from the center part (center 272) of the second base part 3 as seen from the upper surface 321 of the second base part 3. Thereby, external forces applied to the force detector 1 may be stably detected.

Further, in the embodiment, all of the sensor devices 6A to 6D are mounted in the same orientation, however, the orientations of the sensor devices 6A to 6D may be different from one another.

Thus arranged sensor devices 6 have the charge output elements 10 and packages 60 housing the charge output elements 10 as shown in FIG. 1. Further, in the embodiment, the sensor devices 6A to 6D have the same configuration.

As below, the charge output elements 10 of the sensor devices 6 will be described in detail. Note that the packages housing the charge output elements 10 will be described later in detail.

Charge Output Elements

The charge output element 10 has a function of outputting electric charge in response to an external force applied to the force detector 1, i.e., an external force applied to one base part of the first base part 2 and the second base part 3.

The respective charge output elements 10 of the sensor devices 6A to 6D have the same configuration, and one charge output element 10 will be centered for explanation.

As shown in FIG. 4, the charge output element 10 of the sensor device 6 has ground electrode layers 11, a first sensor 12, a second sensor 13, and a third sensor 14.

The first sensor 12 has a function of outputting electric charge Qx (one of electric charge Qx1, Qx2, Qx3, Qx4) in response to an external force (shear force). The second sensor 13 has a function of outputting electric charge Qz (Qz1, Qz2, Qz3, Qz4) in response to an external force (compression/tension force). The third sensor 14 has a function of outputting electric charge Qy (Qy1, Qy2, Qy3, Qy4) in response to an external force (shear force).

In the charge output element 10 of the sensor device 6, the ground electrode layers 11 and the respective sensors 11, 12, 13 are alternately laminated in parallel. As below, the lamination direction is referred to as "lamination direction LD". The lamination direction LD is orthogonal to a normal $NL_2$ of the upper surface 321 (or a normal $NL_1$ of the lower surface 221). Further, the lamination direction LD is in parallel to the sandwich direction SD.

The shape of the charge output element 10 is not particularly limited, however, in the embodiment, a rectangular shape as seen from a direction perpendicular to the inner wall surface 331 of each side surface 33. The other outer shapes of the respective charge output elements 10 include, e.g., other polygonal shapes of pentagonal shapes, circular shapes, oval shapes, etc.

As below, the ground electrode layers 11, the first sensor 12, the second sensor 13, and the third sensor 14 will be described in detail.

The ground electrode layer 11 is an electrode grounded to the ground (reference potential point). The material constituting the ground electrode layer 11 is not particularly limited. For example, gold, titanium, aluminum, copper, iron, or an alloy containing the metals is preferably used. Of them, particularly, stainless as an iron alloy is preferably used. The ground electrode layer 11 including the stainless has advantageous durability and corrosion resistance.

The first sensor 12 has a function of outputting electric charge Qx in response to an external force (shear force) in the first detection direction orthogonal to the lamination direction LD (first sandwich direction), i.e., the same direction as the direction of the normal $NL_2$ (normal $NL_1$). That is, the first sensor 12 is adapted to output positive charge or negative charge in response to an external force.

The first sensor 12 has a first piezoelectric layer (first detection plate) 121, a second piezoelectric layer (first detection plate) 123 provided to be opposed to the first piezoelectric layer 121, and an output electrode layer 122 provided between the first piezoelectric layer 121 and the second piezoelectric layer 123.

The first piezoelectric layer 121 is formed by a Y-cut crystal plate and has an x-axis, a y-axis, and a z-axis orthogonal to one another. The y-axis is an axis along the thickness direction of the first piezoelectric layer 121, the x-axis is an axis along the paper depth direction in FIG. 4, and the z-axis is an axis along the longitudinal direction in FIG. 4.

As below, the explanation will be made with the pointing end sides of the respective arrows as "+ (positive)" and the base end sides of the arrows as "− (negative)". Further, the direction in parallel to the x-axis is referred to as "x-axis direction", the direction in parallel to the y-axis is referred to as "y-axis direction", and the direction in parallel to the z-axis is referred to as "z-axis direction". Note that this applies to the second piezoelectric layer 123, a third piezoelectric layer 131, a fourth piezoelectric layer 133, a fifth piezoelectric layer 141, and a sixth piezoelectric layer 143, which will be described later.

The first piezoelectric layer 121 including crystal has advantageous properties such as a wider dynamic range, higher rigidity, a higher natural frequency, and higher load bearing. Further, the Y-cut crystal plate generates electric charge for the external force (shear force) along the surface direction thereof.

When an external (shear) force along the positive direction of the x-axis is applied to the surface of the first piezoelectric layer 121, electric charge is induced within the first piezoelectric layer 121 due to the piezoelectric effect. As a result, positive charge collects near the surface at the output electrode layer 122 side of the first piezoelectric layer 121, and negative charge collects near the surface at the ground electrode layer 11 side of the first piezoelectric layer 121. Similarly, when an external force along the negative direction of the x-axis is applied to the surface of the first piezoelectric layer 121, negative charge collects near the surface at the output electrode layer 122 side of the first piezoelectric layer 121, and positive charge collects near the surface at the ground electrode layer 11 side of the first piezoelectric layer 121.

The second piezoelectric layer 123 is also formed by a Y-cut crystal plate and has an x-axis, a y-axis, and a z-axis orthogonal to one another. The y-axis is an axis along the thickness direction of the second piezoelectric layer 123, the x-axis is an axis along the paper depth direction in FIG. 4, and the z-axis is an axis along the longitudinal direction in FIG. 4.

Like the first piezoelectric layer 121, the second piezoelectric layer 123 including crystal has advantageous properties such as a wider dynamic range, higher rigidity, a higher natural frequency, and higher load bearing, and the Y-cut crystal plate generates electric charge for the external force (shear force) along the surface direction thereof.

When an external force (shear force) along the positive direction of the x-axis is applied to the surface of the second piezoelectric layer 123, electric charge is induced within the second piezoelectric layer 123 due to the piezoelectric effect. As a result, positive charge collects near the surface at the output electrode layer 122 side of the second piezoelectric layer 123, and negative charge collects near the surface at the ground electrode layer 11 side of the second piezoelectric layer 123. Similarly, when an external force along the negative direction of the x-axis is applied to the surface of the second piezoelectric layer 123, negative charge collects near the surface at the output electrode layer 122 side of the second piezoelectric layer 123, and positive charge collects near the surface at the ground electrode layer 11 side of the second piezoelectric layer 123.

The output electrode layer 122 has a function of outputting positive charge or negative charge generated within the first piezoelectric layer 121 and the second piezoelectric layer 123 as electric charge Qx. As described above, when an external force along the positive direction of the x-axis is applied to the surface of the first piezoelectric layer 121 or the surface of the second piezoelectric layer 123, positive charge collects near the output electrode layer 122. As a result, positive charge Qx is output from the output electrode layer 122. On the other hand, when an external force along the negative direction of the x-axis is applied to the surface of the first piezoelectric layer 121 or the surface of the second piezoelectric layer 123, negative charge collects near the output electrode layer 122. As a result, negative charge Qx is output from the output electrode layer 122.

Further, the configuration of the first sensor 12 having the first piezoelectric layer 121 and the second piezoelectric layer 123 may increase the positive charge or negative charge collecting near the output electrode layer 122 compared to the configuration having only one of the first piezoelectric layer 121 and the second piezoelectric layer 123 and the output electrode layer 122. As a result, the electric charge Qx output from the output electrode layer 122 may be increased. This applies to the second sensor 13 and the third sensor 14, which will be described later.

It is preferable that the size of the output electrode layer 122 is equal to or larger than the sizes of the first piezoelectric layer 121 and the second piezoelectric layer 123. When the output electrode layer 122 is smaller than the first piezoelectric layer 121 or the second piezoelectric layer 123, part of the first piezoelectric layer 121 or the second piezoelectric layer 123 is not in contact with the output electrode layer 122. Accordingly, it may be impossible to output part of the electric charge generated in the first piezoelectric layer 121 or the second piezoelectric layer 123 from the output electrode layer 122. As a result, the electric charge Qx output from the output electrode layer 122 decreases. This applies to output electrode layers 132, 142, which will be described later.

The second sensor 13 has a function of outputting electric charge Qz in response to an external force (compression/tension force). That is, the second sensor 13 is adapted to output positive charge in response to a compression force and negative charge in response to a tension force.

The second sensor 13 has the third piezoelectric layer (third substrate) 131, the fourth piezoelectric layer (third substrate) 133 provided to be opposed to the third piezoelectric layer 131, and the output electrode layer 132 provided between the third piezoelectric layer 131 and the fourth piezoelectric layer 133.

The third piezoelectric layer 131 is formed by an X-cut crystal plate and has an x-axis, a y-axis, and a z-axis orthogonal to one another. The x-axis is an axis along the thickness direction of the third piezoelectric layer 131, the y-axis is an axis along the longitudinal direction in FIG. 4, and the z-axis is an axis along the paper depth direction in FIG. 4.

When a compression force in parallel to the x-axis is applied to the surface of the third piezoelectric layer 131, electric charge is induced within the third piezoelectric layer 131 due to the piezoelectric effect. As a result, positive charge collects near the surface at the output electrode layer 132 side of the third piezoelectric layer 131, and negative charge collects near the surface at the ground electrode layer 11 side of the third piezoelectric layer 131. Similarly, when a tension force in parallel to the x-axis is applied to the surface of the third piezoelectric layer 131, negative charge collects near the surface at the output electrode layer 132 side of the third piezoelectric layer 131, and positive charge collects near the surface at the ground electrode layer 11 side of the third piezoelectric layer 131.

The fourth piezoelectric layer 133 is also formed by an X-cut crystal plate and has an x-axis, a y-axis, and a z-axis orthogonal to one another. The x-axis is an axis along the thickness direction of the fourth piezoelectric layer 133, the y-axis is an axis along the longitudinal direction in FIG. 4, and the z-axis is an axis along the paper depth direction in FIG. 4.

When a compression force in parallel to the x-axis is applied to the surface of the fourth piezoelectric layer 133, electric charge is induced within the fourth piezoelectric layer 133 due to the piezoelectric effect. As a result, positive charge collects near the surface at the output electrode layer 132 side of the fourth piezoelectric layer 133, and negative charge collects near the surface at the ground electrode layer 11 side of the fourth piezoelectric layer 133. Similarly, when a tension force in parallel to the x-axis is applied to the surface of the fourth piezoelectric layer 133, negative charge collects near the surface at the output electrode layer 132 side of the fourth piezoelectric layer 133, and positive charge collects near the surface at the ground electrode layer 11 side of the fourth piezoelectric layer 133.

The output electrode layer 132 has a function of outputting electric positive charge or negative charge generated within the third piezoelectric layer 131 and the fourth piezoelectric layer 133 as electric charge Qz. As described above, when a compression force in parallel to the x-axis is applied to the surface of the third piezoelectric layer 131 or the surface of the fourth piezoelectric layer 133, positive charge collects near the output electrode layer 132. As a result, positive charge Qz is output from the output electrode layer 132. On the other hand, when a tension force in parallel to the x-axis is applied to the surface of the third piezoelectric layer 131 or the surface of the fourth piezoelectric layer 133, negative charge collects near the output electrode layer 132. As a result, negative charge Qz is output from the output electrode layer 132.

The third sensor 14 has a function of outputting electric charge Qx in response to an external force (shear force) in the second detection direction orthogonal to the lamination direction LD (second sandwich direction) and intersecting with the first detection direction of the external force acting when the first sensor 12 outputs the electric charge Qx. That is, the third sensor 14 is adapted to output positive charge or negative charge in response to an external force.

The third sensor 14 has the fifth piezoelectric layer (second detection plate) 141, the sixth piezoelectric layer (second detection plate) 143 provided to be opposed to the fifth piezoelectric layer 141, and an output electrode layer 142 provided between the fifth piezoelectric layer 141 and the sixth piezoelectric layer 143.

The fifth piezoelectric layer 141 is formed by a Y-cut crystal plate and has an x-axis, a y-axis, and a z-axis orthogonal to one another. The y-axis is an axis along the thickness direction of the fifth piezoelectric layer 141, the x-axis is an axis along the longitudinal direction in FIG. 4, and the z-axis is an axis along the paper depth direction in FIG. 4.

The fifth piezoelectric layer 141 including crystal has advantageous properties such as a wider dynamic range, higher rigidity, a higher natural frequency, and higher load bearing. Further, the Y-cut crystal plate generates electric charge for the external force (shear force) along the surface direction thereof.

When an external force along the positive direction of the x-axis is applied to the surface of the fifth piezoelectric layer 141, electric charge is induced within the fifth piezoelectric layer 141 due to the piezoelectric effect. As a result, positive charge collects near the surface at the output electrode layer 142 side of the fifth piezoelectric layer 141, and negative charge collects near the surface at the ground electrode layer 11 side of the fifth piezoelectric layer 141. Similarly, when an external force along the negative direction of the x-axis is applied to the surface of the fifth piezoelectric layer 141, negative charge collects near the surface at the output electrode layer 142 side of the fifth piezoelectric layer 141, and positive charge collects near the surface at the ground electrode layer 11 side of the fifth piezoelectric layer 141.

The sixth piezoelectric layer 143 is also formed by a Y-cut crystal plate and has an x-axis, a y-axis, and a z-axis orthogonal to one another. The y-axis is an axis along the thickness direction of the sixth piezoelectric layer 143, the x-axis is an axis along the longitudinal direction in FIG. 4, and the z-axis is an axis along the paper depth direction in FIG. 4.

Like the fifth piezoelectric layer 141, the sixth piezoelectric layer 143 including crystal has advantageous properties such as a wider dynamic range, higher rigidity, a higher natural frequency, and higher load bearing, and the Y-cut crystal plate generates electric charge for the external force (shear force) along the surface direction thereof.

When an external force along the positive direction of the x-axis is applied to the surface of the sixth piezoelectric layer 143, electric charge is induced within the sixth piezoelectric layer 143 due to the piezoelectric effect. As a result, positive charge collects near the surface at the output electrode layer 142 side of the sixth piezoelectric layer 143, and negative charge collects near the surface at the ground electrode layer 11 side of the sixth piezoelectric layer 143. Similarly, when an external force along the negative direction of the x-axis is applied to the surface of the sixth piezoelectric layer 143, negative charge collects near the surface at the output electrode layer 142 side of the sixth piezoelectric layer 143, and positive charge collects near the surface at the ground electrode layer 11 side of the sixth piezoelectric layer 143.

In the charge output element 10, as seen from the lamination direction LD, the respective x-axes of the first piezoelectric layer 121 and the second piezoelectric layer 123 intersect with the respective x-axes of the fifth piezoelectric layer 141 and the sixth piezoelectric layer 143. Further, as seen from the lamination direction LD, the respective z-axes of the first piezoelectric layer 121 and the second piezoelectric layer 123 intersect with the respective z-axes of the fifth piezoelectric layer 141 and the sixth piezoelectric layer 143.

The output electrode layer 142 has a function of outputting positive charge or negative charge generated within the fifth piezoelectric layer 141 and the sixth piezoelectric layer 143 as electric charge Qy. As described above, when an external force along the positive direction of the x-axis is applied to the surface of the fifth piezoelectric layer 141 or the surface of the sixth piezoelectric layer 143, positive charge collects near the output electrode layer 142. As a result, positive charge Qy is output from the output electrode layer 142. On the other hand, when an external force along the negative direction of the x-axis is applied to the surface of the fifth piezoelectric layer 141 or the surface of the sixth piezoelectric layer 143, negative charge collects near the output electrode layer 142. As a result, negative charge Qy is output from the output electrode layer 142.

As described above, in the charge output element 10, the first sensor 12, the second sensor 13, and the third sensor 14 are laminated so that the force detection directions of the respective sensors may be orthogonal to one another. Thereby, the respective sensors may induce electric charge in response to force components orthogonal to one another. Accordingly, the charge output element 10 may output three electric charges Qx, Qy, Qz in response to the respective external forces along the x-axis, the y-axis, and the z-axis.

Further, as described above, the charge output element 10 may output the electric charge Qz, however, it is preferable not to use the electric charge Qz for obtaining the respective external forces in the force detector 1. That is, it is preferable to use the force detector 1 as an apparatus that detects shear force not detecting compression and tension force. Thereby, noise components due to temperature changes of the force detector 1 may be reduced.

Here, as the reason why it is preferable not to use the electric charge Qz, the case where the force detector 1 is used for an industrial robot having an arm to which an end effector is attached will be explained as an example. In this case, by heat transfer from heat source such as motors provided in the arm and the end effector, the first base part 2 or the second base part 3 are heated and thermally expanded, and deformed. Due to the deformation, the pressurization on the charge output elements 10 changes from a predetermined values. The electric charge Qz contains the pressurization changes on the charge output elements 10 as noise components due to the temperature changes of the force detector 1 to the degree of significant influence.

On this account, the charge output elements 10 detect only the electric charges Qx, Qy generated by application of shear forces without using the electric charge Qz generated by application of compression and tension forces, and thereby, may be harder to be influenced by the temperature variations.

Note that the output electric charge Qz is used for e.g., adjustment of the pressurization by the pressurization bolts 71.

Further, in the embodiment, all of the above described respective piezoelectric layers (first piezoelectric layer 121, second piezoelectric layer 123, third piezoelectric layer 131, fourth piezoelectric layer 133, fifth piezoelectric layer 141, and sixth piezoelectric layer 143) are formed using crystal, however, the respective piezoelectric layers may have configurations using other piezoelectric materials than crystal. The other piezoelectric materials than crystal include e.g., topaz, barium titanate, lead titanate, lead titanate zirconate (PZT: $Pb(Zr,Ti)O_3$), lithium niobate, lithium tantalate, etc. However, it is preferable that the respective piezoelectric layers have configurations using crystal. This is because the piezoelectric layers including crystal have advantageous properties such as wider dynamic ranges, higher rigidity, higher natural frequencies, and higher load bearing.

Furthermore, as described above, the first base part 2 and the second base part 3 are secured by the pressurization bolts 71.

The securement by the pressurization bolts 71 is performed by inserting the pressurization bolts 71 from the side walls 33 side of the second base part 3 toward the convex portions 23 of the first base part 2, and screwing external threads (not shown) of the pressurization bolts 71 in the internal threads 241 formed in the first base part 2 in such a state that each sensor device 6 is arranged between the top surface 231 and the inner wall surface 331. In this manner, to the charge output elements 10, pressure having predetermined magnitude, i.e., pressurization is applied by the first base part 2 and the second base part 3 with respect to each package 60 housing the charge output element 10.

Note that the first base part 2 and the second base part 3 are secured by the two pressurization bolts 71 to be displaceable (movable) in a predetermined amount with respect to each other. The first base part 2 and the second base part 3 are secured to be displaceable in the predetermined amount with respect to each other, and thereby, when an external force (shear force) is applied to the force detector 1 and the shear force acts on the charge output elements 10, friction forces are reliably generated between the layers forming the charge output elements 10 and electric charge may be reliably detected. Further, the pressurization directions by the respective pressurization bolts 71 are directions in parallel to the lamination direction LD.

As shown in FIG. 5, regarding the charge output element 10 having the above described configuration, the lamination directions LD is tilted at a tilt angle £ with respect to the α-axis. Specifically, the x-axis of the first sensor 12 and the z-axis of the third sensor 14 are tilted at the tilt angle ε with respect to the α-axis. Therefore, in the embodiment, the α-axis is a bisector that bisects the angle formed by the charge output element 10 of the sensor device 6A and the charge output element 10 of the sensor device 6B.

Further, as shown in FIG. 6, supposing that the angle formed by the x-axis of the first sensor 12 and the bottom plate 22 of the first base part 2 is η, each charge output element 10 is permitted to tilt to the degree that the angler η satisfies 0°≤η<90°. Note that FIG. 6 is a diagram as seen from an arrow D in FIG. 5, and the charge output element 10 tilted at the angle η with respect to the α-axis (the lower surface 221 of the bottom plate 22) is shown by hypothetical lines (dashed two-dotted lines).

Next, the conversion output circuit 90a, the conversion output circuit 90b, and the conversion output circuit 90c of the respective analog circuit boards 4 will be described in detail.

Conversion Output Circuits

As shown in FIG. 3, each conversion output circuit 90c converts one of electric charges Qx1 to Qx4 (Qx) into one of the voltages Vx1 to Vx4 (representatively referred to as "voltage Vx"), each conversion output circuit 90b converts one of electric charges Qz1 to Qz4 (Qz) into one of the voltages Vz1 to Vz4 (representatively referred to as "voltage Vz"), and each conversion output circuit 90a converts one of electric charges Qy1 to Qy4 (Qy) into one of the voltages Vy1 to Vy4 (representatively referred to as "voltage Vy").

As below, the configurations etc. of the conversion output circuits 90a, 90b, 90c will be described in detail, and the conversion output circuit 90c will be representatively explained because the respective conversion output circuits 90a, 90b, 90c have the same configuration.

As shown in FIG. 3, the conversion output circuit 90c has a function of converting the electric charge Qx output from the charge output element 10 into the voltage Vx and outputting the voltage Vx. The conversion output circuit 90c has an operational amplifier 91, a capacitor 92, and a switching element 93. The first input terminal (negative input) of the operational amplifier 91 is connected to the output electrode layer 122 of the charge output element 10, and the second input terminal (positive input) of the operational amplifier 91 is grounded to the ground (reference potential point). Further, the output terminal of the operational amplifier 91 is connected to the external force detection circuit 40. The capacitor 92 is connected between the first input terminal and the output terminal of the operational amplifier 91. The switching element 93 is connected between the first input terminal and the output terminal of the operational amplifier 91 and parallel-connected to the capacitor 92. Furthermore, the switching element 93 is connected to a drive circuit (not shown) and the switching element 93 executes switching operation according to on/off signals from the drive circuit.

When the switching element 93 is off, the electric charge Qx output from the charge output element 10 is accumulated in the capacitor 92 having capacitance C1 and output to the external force detection circuit 40 as the voltage Vx. Then, when the switching element 93 is turned on, terminals of the capacitor 92 are short-circuited. As a result, the electric charge Qx accumulated in the capacitor 92 is discharged to be zero coulomb and the voltage V output to the external force detection circuit 40 becomes zero volt. Turning on of the switching element 93 is referred to as resetting of the conversion output circuit 90c. Note that the voltage Vx output from the ideal conversion output circuit 90c is proportional to the amount of accumulation of the electric charge Qx output from the charge output element 10.

The switching element 93 is e.g., a MOSFET (Metal Oxide Semiconductor Field Effect Transistor), a semiconductor switch, an MEMS switch, or the like. The switch is smaller and lighter than a mechanical switch, and advantageous to reduction in size and weight of the force detector 1. As below, as a representative example, the case where the MOSFET is used as the switching element 93 will be explained. Note that, as shown in FIG. 3, the switch is mounted on the conversion output circuit 90c and the conversion output circuits 90a, 90b, and may be further mounted on the AD converter 401.

The switching element 93 has a drain electrode, a source electrode, and a gate electrode. One of the drain electrode and the source electrode of the switching element 93 is connected to the first input terminal of the operational amplifier 91 and the other of the drain electrode and the source electrode is connected to the output terminal of the operational amplifier 91. Further, the gate electrode of the switching element 93 is connected to the drive circuit (not shown).

To the switching elements 93 of the respective conversion output circuits 90a, 90b, 90c, the same drive circuits may be connected or respective different drive circuits may be connected. To the respective switching elements 93, all of synchronized on/off signals are input from the drive circuits. Thereby, the operations of the switching elements 93 of the respective conversion output circuits 90a, 90b, 90c are synchronized. That is, the on/off timings of the switching elements 93 of the respective conversion output circuits 90a, 90b, 90c coincide.

Next, the external force detection circuit 40 of the digital circuit board 5 will be described in detail.

External Force Detection Circuit

The external force detection circuit 40 has a function of detecting applied external forces based on the voltages Vy1, Vy2, Vy3, Vy4 output from the respective conversion output circuits 90a, the voltages Vz1, Vz2, Vz3, Vz4 output from the respective conversion output circuits 90b, and the voltages Vx1, Vx2, Vx3, Vx4 output from the respective conversion output circuits 90c.

The external force detection circuit 40 has the AD converter 401 connected to the conversion output circuits (conversion circuits) 90a, 90b, 90c and the calculation part (calculation circuit) 402 connected to the AD converter 401.

The AD converter 401 has a function of converting the voltages Vx1, Vy1, Vz1, Vx2, Vy2, Vz2, Vx3, Vy3, Vz3, Vx4 Vy4, Vz4 from analog signals to digital signals. The voltages Vx1, Vy1, Vz1, Vx2, Vy2, Vz2, Vx3, Vy3, Vz3, Vx4 Vy4, Vz4 digitally converted by the AD converter 401 are input to the calculation part 402.

The calculation part 402 performs respective processing of e.g., correction for eliminating differences in sensitivity among the respective conversion output circuits 90a, 90b, 90c etc. on the digitally converted voltages Vx, Vy, Vz. Then, the calculation part 402 outputs three signals proportional to the amounts of accumulation of the electric charges Qx, Qy, Qz output from the charge output elements 10.

Force Detection (Force Detection Method) in α-Axis, β-Axis, γ-Axis Directions

As described above, each charge output element 10 is placed so that the lamination direction LD and the sandwich direction SD may be in parallel to the first base part 2 (bottom plate 22) and orthogonal to the normal $NL_2$ of the upper surface 321 (see FIG. 1).

Further, a force $F_A$ in the α-axis direction, a force $F_B$ in the 1β-axis direction, and a force $F_C$ in the γ-axis direction may be respectively expressed by the following expressions (1), (2), and (3). "$fx_{1-1}$" in the expressions (1) to (3) is a force applied in the x-axis direction of the first sensor 12 (first detection plate) of the sensor device 6A, i.e., a force obtained from the electric charge Qx1 (first output), and "$fx_{1-2}$" is a force applied in the x-axis direction of the third sensor 14 (second detection plate), i.e., a force obtained from the electric charge Qy1 (second output). Furthermore, "$fx_{2-1}$" is a force applied in the x-axis direction of the first sensor 12 (first detection plate) of the sensor device 6B, i.e., a force obtained from the electric charge Qx2 (third output), and "$fx_{2-2}$" is a force applied in the x-axis direction of the third sensor 14 (second detection plate), i.e., a force obtained from the electric charge Qy2 (fourth output).

$$F_A = fx_{1-1} \cos \eta - fx_{1-2} \sin \eta \cos \epsilon - fx_{2-1} \cos \eta \cos \epsilon + fx_{2-2} \sin \eta \cos \epsilon \quad (1)$$

$$F_B = -fx_{1-1} \cos \eta \sin \epsilon + fx_{1-2} \sin \eta \sin \epsilon - fx_{2-1} \cos \eta \sin \epsilon + fx_{2-2} \sin \eta \sin \epsilon \quad (2)$$

$$F_C = -fx_{1-1} \sin \eta - fx_{1-2} \cos \eta - fx_{2-1} \sin \eta - fx_{2-2} \cos \eta \quad (3)$$

For example, in the case of the force detector 1 having the configuration shown in FIGS. 1 and 2, ε is 45° and η is 0°.

By assignment of 45° to ε and 0° to η in the expressions (1) to (3), the forces $F_A$ to $F_C$ are expressed as follows.

$$F_A = fx_{1-1}/\sqrt{2} - fx_{2-1}/\sqrt{2}$$

$$F_B = -fx_{1-1}/\sqrt{2} - fx_{2-1}/\sqrt{2}$$

$$F_C = -fx_{1-2} - fx_{2-2}$$

As described above, in the force detector 1, when the forces $F_A$ to $F_C$ are detected, the detection may be performed without using the second sensor 13 (electric charge Qz) easily influenced by temperature variations, i.e., with noise easily superimposed thereon. Therefore, the force detector 1 is an apparatus harder to be influenced by the temperature variations in which, for example, the influence is reduced to a twentieth part or less of that in a force detector of related art. Thereby, the force detector 1 may detect the forces $F_A$ to $F_C$ accurately and stably even under environments with severe temperature changes.

Note that the translational forces $F_A$ to $F_C$ and rotational forces $M_A$ to $M_C$ of the whole force detector 1 in the embodiment are calculated based on the electric charges from the respective charge output elements 10. Further, the four charge output elements 10 are provided in the embodiment, however, it is possible to calculate the rotational forces $M_A$ to $M_C$ if at least three charge output elements 10 are provided.

The force detector 1 having the above described configuration has a total weight lighter than 1 kg. Thereby, the load on the wrist to which the weight of the force detector 1 is attached may be reduced and the volume of the actuator for driving the wrist may be made smaller, and thus, the wrist may be designed to be smaller. Furthermore, the weight of the force detector 1 is lighter than 20% of the maximum capacity transportation by the robot arm. Thereby, the robot arm to which the weight of the force detector 1 is attached may be controlled more easily.

The invention has a feature in the configuration of the package 60 housing the above described charge output element 10. As below, the package 60 will be described in detail.

FIG. 7 is an enlarged longitudinal section view of the sensor device 6. In FIG. 7, illustration of the analog circuit board 4 is omitted. Further, for convenience of explanation, in FIG. 7, upside is referred to as "upper" or "above" and the downside is referred to as "lower" or "below".

Package

As shown in FIG. 7, the package 60 has a bottom plate member (first member) 61, a lid member (second member) provided to face the bottom plate member 61, and a side wall member (third member) 67 that connects the bottom plate member 61 and the lid member 62. By the package 60, the charge output element 10 is air-tightly sealed and shielded from outside air, and thereby, the output electric charge is prevented from unintendedly leaking due to moisture or the like.

The bottom plate member 61 has a flat plate shape and is provided in contact with the top surface 231 of the convex portion 23 of the first base part 2. The bottom plate member 61 has a function of transmitting the external force applied to the first base part 2 to the charge output element 10.

The plan view shape of the bottom plate member 61 has a shape corresponding to the top surface 231 of the convex portion 23 and is formed so that the plane area may be slightly larger than the area of the top surface 231. Therefore, in a state in which the sensor device 6 is fixed between the first base part 2 and the second base part 3, an outer edge portion 611 of the bottom plate member 61 projects from the convex portion 23 toward the side.

Note that, as shown in FIG. 7, it is preferable that the plane area of the bottom plate member 61 has a size to cover the charge output element 10, however, may have a smaller shape than the charge output element 10 or may have an equal size.

In the embodiment, the plan view shape of the bottom plate member 61 is a rectangular shape, however, may be another polygonal shape than the rectangular shape, a circular shape, an oval shape, or the like. Further, the corner parts of the bottom plate member 61 may be rounded or obliquely cut out.

To the outer edge portion 611 of the bottom plate member 61, the side wall member 67 forming a rectangular tubular shape is bonded. A concave portion 65 is defined by the side wall member 67 and the bottom plate member 61, and the charge output element 10 is provided apart from the inner wall surface of the side wall member 67 within the concave portion 65.

The side wall member 67 has a lower side portion 671 bonded to the bottom plate member 61, and an upper side portion 672 provided on the lower side portion 671 and having a through hole with a cross-section area larger than a cross-section area of a through hole of the lower side portion 671. Therefore, in a state in which the lower side portion 671 and the upper side portion 672 are bonded, part of the upper surface of the lower side portion 671 is exposed within the through hole of the upper side portion 672.

On the inner wall surface of the lower side portion 671, a step portion 673 formed by increasing the cross-section area of the through hole in the middle of the height direction is provided. To the step portion 673, the bottom plate member 61 is bonded apart from the inner wall surface of the side wall member 67 (lower side portion 671).

Further, in predetermined locations of the lower side portion 671, four terminals 66 are provided over the upper surface, the outer wall surface, and the lower surface of the lower side portion 671. An upper portion 662 of the terminal 66 is exposed within the through hole (convex portion 65) of the upper side portion 672, and bonded to a connecting portion 64 in the upper portion 662. Thereby, the terminal 66 is electrically connected to the charge output element 10 via the connecting portion 64. Further, a lower portion 661 of the terminal 66 is exposed from the lower surface of the side wall member 67 to the outside, and bonded to the analog circuit board 4 via wiring (not shown).

Note that it is only necessary that the terminal 66 has conductivity. For example, the terminal may be formed by stacking respective films of nickel, gold, silver, copper on a metallization layer (foundation layer) of chromium, tungsten, or the like. Further, the connecting portion 64 may be formed using e.g., conductive paste such as Ag paste, Cu paste, or Au paste, and preferably formed using the Ag paste because the paste is easily available and advantageous in handling.

On the upper surface of the side wall member 67 (upper side portion 672), the lid member 62 is bonded via sealant 63 including e.g., gold, titanium, aluminum, copper, iron, or an alloy containing them.

The lid member 62 is provided in contact with the second base part 3, and has a function of transmitting the external force applied to the second base part 3 to the charge output element 10.

The lid member 62 is formed to have a dish shape as a whole by bending (or curving) deformation of a flat plate-like member so that the center portion 625 may project from an outer periphery portion 626 toward the second base part 3. According to the configuration, the center portion 625 of the lid member 62 is in contact with the inner wall surface 331 of the second base part 3. Note that the plan view shape of the center portion 625 is not particularly limited, however, in the embodiment, is a shape corresponding to the plan view shape of the charge output element 10, i.e., a rectangular shape.

The thicknesses of the bottom plate member 61 and the lid member 62 may be different from each other or the same.

In the package 60 having the configuration, a longitudinal elastic modulus (first longitudinal elastic modulus) of at least a part of the bottom plate member 61 and a longitudinal elastic modulus (second longitudinal elastic modulus) of at least apart of the lid member 62 are respectively lower than a longitudinal elastic modulus (third longitudinal elastic modulus) of the side wall member 67.

Accordingly, the bottom plate member 61 and the lid member 62 are more elastically deformable when stress is applied thereto than the side wall member 67. Thereby, even when external forces are repeatedly applied to the first base part 2 and the second base part 3, the bottom plate member 61 and the lid member 62 may be deformed in response to the external forces. Therefore, breakage of the bottom plate member 61 and the lid member 62 may be reduced. Thus, the force detector 1 is advantageous in reliability over a long period. Further, when the sensor device 6 is fixed between the first base part 2 and the second base part 3 by the pressurization bolts 71, if pressure beyond necessity is applied to the bottom plate member 61 and the lid member 62 by fastening of the pressurization bolts 71, breakage of the bottom plate member 61 and the lid member 62 may be reduced.

As described above, the charge output element 10 and the bottom plate member 61 are provided apart from the inner wall surface of the side wall member 67. Accordingly, even when the charge output element 10 and the bottom plate member 61 are deformed, contact with the side wall member 67 may be avoided. Thereby, also, breakage of the charge output element 10 and the bottom plate member 61 may be reduced. From the viewpoint, the force detector 1 is also advantageous in reliability over a long period.

Further, in the bottom plate member 61, only a part thereof (particularly, only the part in contact with the convex portion 23) may have the first longitudinal elastic modulus, however, it is preferable that the member has the first longitudinal elastic modulus over the whole. Thereby, the bottom plate member 61 may be formed by a single member and a single material, and the longitudinal elastic modulus and the mechanical strength may be homogenized over the whole bottom plate member 61. Accordingly, breakage of the bottom plate member 61 due to the external force applied to the first base part 2 may be reduced more reliably, and the external force may be transmitted to the charge output element 10 via the bottom plate member 61 more accurately.

In the lid member 62, a part thereof (particularly, only the center portion 625) may have the second longitudinal elastic modulus, however, it is preferable that the member has the second longitudinal elastic modulus over the whole. Thereby, the lid member 62 may be formed by a single member and a single material, and the longitudinal elastic modulus and the mechanical strength may be homogenized over the whole of the lid member 62. Particularly, the lid member 62 has the shape such that the center portion 625 and the outer periphery portion 626 are connected by an inclined portion (dish shape), and, when the lid member is formed by a single member and a single material, rapid changes in mechanical strength in the bonded parts of the respective portions may be reduced. Accordingly, breakage of the lid member 62 due to the external force applied to the second base part 3 may be reduced more reliably, and the external force may be transmitted to the charge output element 10 via the lid member 62 more accurately.

Further, the difference between the first longitudinal elastic modulus and the second longitudinal elastic modulus is preferably a tenth part or less, more preferably a twentieth part or less, even more preferably a thirtieth part or less of the first longitudinal elastic modulus. Thereby, concentration of stress on only one of the bottom plate member 61 and the lid member 62 may be avoided. Accordingly, the external forces applied to the first base part 2 and second base part 3 are dispersed, and thereby, breakage of the bottom plate member 61 and the lid member 62 may be reduced more reliably.

Specifically, the first longitudinal elastic modulus is preferably from 50 GPa to 300 GPa, more preferably from 100 GPa to 250 GPa, and even more preferably from 120 GPa to 200 GPa. If the first longitudinal elastic modulus is within the ranges, the bottom plate member 61 has moderate rigidity and is efficiently elastically deformed. Accordingly, even when external forces are repeatedly applied to the first base part 2, the bottom plate member 61 is deformed in response to the external forces more precisely. Therefore, breakage of the bottom plate member 61 due to the external force applied to the first base part 2 may be reduced more reliably, and the external force may be transmitted to the charge output element 10 via the bottom plate member 61 more accurately.

Further, the second longitudinal elastic modulus is preferably from 50 GPa to 300 GPa, more preferably from 100 GPa to 250 GPa, and even more preferably from 120 GPa to 200 GPa. If the second longitudinal elastic modulus is within the ranges, the lid member 62 has moderate rigidity and is efficiently elastically deformed. Accordingly, even when external forces are repeatedly applied to the second base part 3, the lid member 62 is deformed in response to the external forces more precisely. Therefore, breakage of the lid member 62 due to the external force applied to the second base part 3 may be reduced more reliably, and the external force may be transmitted to the charge output element 10 via the lid member 62 more accurately.

Furthermore, the third longitudinal elastic modulus is preferably from 200 GPa to 500 GPa, more preferably from 250 GPa to 480 GPa, and even more preferably from 300 GPa to 450 GPa. If the third longitudinal elastic modulus is within the ranges, the side wall member 67 has sufficient rigidity, and the mechanical strength as the whole package 60 may be sufficiently secured. Accordingly, even when external forces are repeatedly applied thereto, damage by the deformation of the package 60 is harder to be caused, and the charge output element 10 housed inside may be protected more reliably.

Note that the third longitudinal elastic modulus refers to a longitudinal elastic modulus in the whole side wall member 67 including the plurality of members.

Further, it is preferable that coefficients of thermal expansion of the bottom plate members 61, the lid members 62, and the side wall members 67 are respectively as close to coefficients of thermal expansion of the piezoelectric layers 121, 123, 131, 133, 141, 143 of the charge output elements 10 as possible. Thereby, even when the piezoelectric layers 121, 123, 131, 133, 141, 143 expand or contract due to temperature changes, the bottom plate members 61, the lid members 62, and the side wall members 67 expand or contract equally to the piezoelectric layers. Accordingly, compression stress or tension stress generated in the piezoelectric layers 121, 123, 131, 133, 141, 143 due to the differences in degree of thermal deformation from the bottom plate members 61, the lid members 62, and the side wall members 67 may be further reduced. Therefore, output of unnecessary electric charges due to temperature changes may be further reduced, and thus, the force detector 1 may perform force detection with higher accuracy.

In the embodiment, the piezoelectric layers 121, 123, 131, 133, 141, 143 include crystal, and the coefficients of thermal expansion from 25° C. to 200° C. in the x-axis directions are $13.4 \times 10^{-6} (1/K)$, the coefficients of thermal expansion from 25° C. to 200° C. in the y-axis directions are $13.4 \times 10^{-6} (1/K)$, and the coefficients of thermal expansion from 25° C. to 200° C. in the z-axis directions are $7.8 \times 10^{-6} (1/K)$.

Therefore, when the piezoelectric layers 121, 123, 131, 133, 141, 143 include crystal, the coefficients of thermal expansion from 25° C. to 200° C. of the respective constituent materials for the bottom plate members 61, the lid members 62, and the side wall members 67 are preferably from $1 \times 10^{-6} (1/K)$ to $1 \times 10^{-7} (1/K)$ and more preferably from $3 \times 10^{-6} (1/K)$ to $9 \times 10^{-6} (1/K)$. Thereby, compression stress or tension stress generated in the respective piezoelectric layers 121, 123, 131, 133, 141, 143 due to the differences in degree of thermal deformation among the bottom plate members 61, the lid members 62, and the side wall members 67 may be further reduced.

The constituent material of the bottom plate member 61 and the constituent material of the lid member 62 may be the same or different, but preferably the same. Thereby, the longitudinal elastic moduli and the coefficients of thermal expansion of the bottom plate member 61 and the lid member 62 may be made nearly equal. Accordingly, breakage of the bottom plate member 61 and the lid member 62 due to the applied external force may be reduced more effectively. Further, compression stress or tension stress generated in the respective piezoelectric layers 121, 123, 131, 133, 141, 143 due to the differences in degree of thermal deformation between the bottom plate members 61 and the lid members 62 may be further reduced. Furthermore, the constituent material of the bottom plate member 61 and the constituent material of the lid member 62 are the same, and material properties including e.g., lateral elastic modulus and hardness may be made nearly equal. Thereby, concentration of the applied external force on only one of the bottom plate member 61 and the lid member 62 may be avoided, and unintended deformation and breakage of them may be reduced especially effectively.

Here, in this specification, the same constituent materials include not only materials having completely the same composition ratio but also materials having slightly different composition ratios, but having nearly equal properties (longitudinal elastic moduli and coefficients of thermal expansion).

The constituent materials of the bottom plate member 61 and the lid member 62 that satisfy the above described conditions include various metal materials, e.g., stainless steel, kovar, copper, iron, carbon steel, titanium, etc. Of them, particularly, kovar is preferable. Thereby, the bottom plate member 61 has relatively high rigidity and is moderately elastically deformed by stress application. Accordingly, the bottom plate member 61 may accurately transmit the external force applied to the first base part 2 to the charge output element 10, and breakage due to the external force may be further reduced. Kovar is also preferable in the viewpoint of advantageous molding processability.

The coefficient of thermal expansion from 25° C. to 200° C. of kovar is $5.2 \times 10^{-6} (1/K)$ and a value closer to the coefficient of thermal expansion of crystal. Accordingly, as in the embodiment, when the piezoelectric layers 121, 123, 131, 133, 141, 143 of the charge output elements 10 include crystal, compression stress or tension stress generated in the respective piezoelectric layers 121, 123, 131, 133, 141, 143 due to the differences in degree of thermal deformation between the bottom plate members 61 and the lid members 62 may be particularly effectively suppressed.

On the other hand, the constituent material of the side wall member 67 that satisfies the above described conditions is not particularly limited. However, an insulating material is preferable, a material containing various kinds of ceramics such as oxide-based ceramics of alumina, zirconia, or the like, carbide-based ceramics of silicon carbide or the like, nitride-based ceramics of silicon nitride or the like is more preferable, and a material consisting primarily of various kinds of ceramics is even more preferable. The ceramics has moderate rigidity and advantageous insulation properties. Accordingly, damage due to deformation of the package 60 is harder to be caused and the charge output element 10 housed inside may be protected more reliably, and short circuit between the terminals 66 may be avoided more reliably. Further, the processing accuracy of the side wall member 67 may be further improved.

Further, it is preferable that the constituent material of the side wall member 67 primarily contains ceramics having the coefficient of thermal expansion that satisfies the above described ranges. Thereby, compression stress or tension stress generated in the piezoelectric layers 121, 123, 131, 133, 141, 143 due to the differences in degree of thermal deformation from the side wall members 67 may be further reduced.

Note that, in the embodiment, the explanation that the first member of the housing part (package) is the bottom plate member, the second member is the lid member, and the third member is the side wall member is made, however, the first member refers to a member located between the piezoelectric element and the first base part in a region where the piezoelectric element and the first base part overlap as seen from the thickness direction of the force detector. Further, the second member refers to a member located between the piezoelectric element and the second base part in a region where the piezoelectric element and the second base part overlap as seen from the thickness direction of the force detector. Furthermore, the third member refers to a member connecting the first member and the second member, preferably refers to a member provided not in contact with the piezoelectric element (charge output element) or the first base part and the second base part.

2. Single-Arm Robot

Next, a single-arm robot as an embodiment of a robot of the invention will be explained with reference to FIG. 8.

Figure 8:
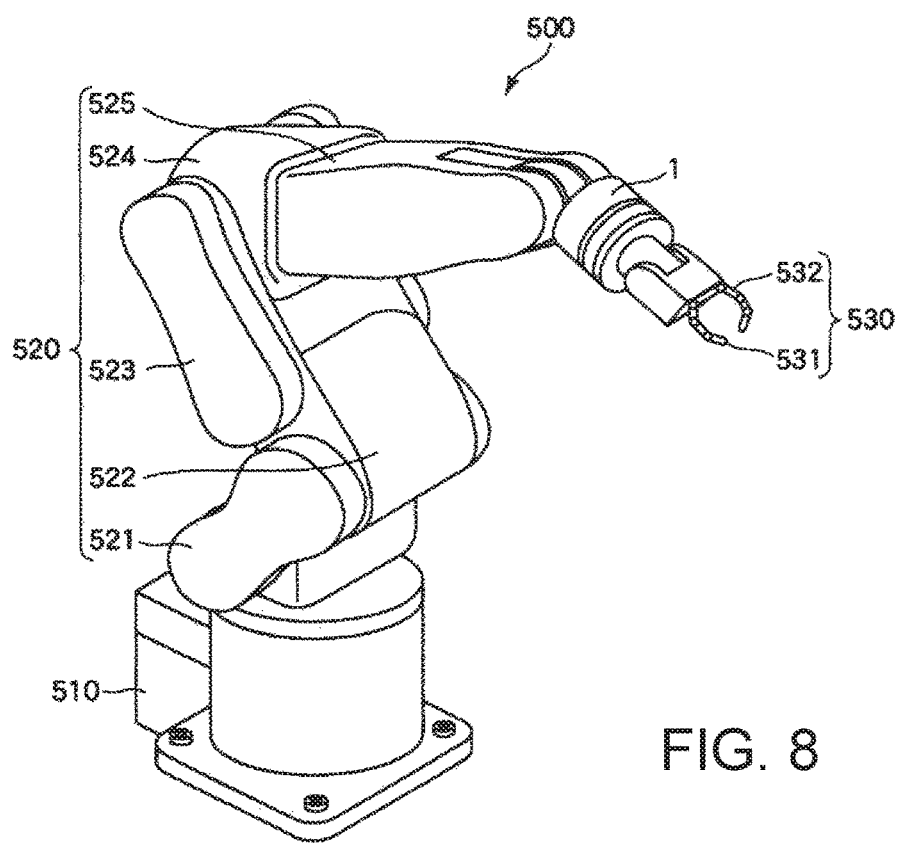
FIG. 8 shows an example of a single-arm robot using the force detector according to the embodiment of the invention.

FIG. 8 shows an example of the single-arm robot using the force detector according to the invention. A single-arm robot 500 in FIG. 8 has a base 510, an arm 520, an end effector 530 provided at the distal end side of the arm 520, and the force detector 1 provided between the arm 520 and the end effector 530. Note that, as the force detector 1, the same one as those in the above described respective embodiments is used.

The base 510 has a function of housing an actuator (not shown) that generates power for rotating the arm 520, a control unit (not shown) that controls the actuator, etc. Further, the base 510 is fixed to a floor, a wall, a ceiling, a movable carriage, or the like, for example.

The arm 520 has a first arm element 521, a second arm element 522, a third arm element 523, a fourth arm element 524, and a fifth arm 525, and is formed by rotatably connecting the adjacent arm elements. The arm 520 is driven by composite rotation or bending around the connecting parts of the respective arm elements under control of the control unit.

The end effector 530 has a function of grasping an object. The end effector 530 has a first finger 531 and a second finger 532. The end effector 530 reaches a predetermined operation position by the driving of the arm 520, then, the separated distance between the first finger 531 and the second finger 532 is adjusted, and thereby, the object may be grasped.

The end effector 530 is a hand here, however, not limited to that in the invention. Other examples of the end effector include a part testing tool, a part carrying tool, a part processing tool, a part assembly tool, a measuring instrument, etc., for example. This applies to the end effectors in the other embodiments.

The force detector 1 has a function of detecting an external force applied to the end effector 530. The force detected by the force detector 1 is fed back to the control unit of the base 510, and thereby, the single-arm robot 500 may execute more precise work. Further, the single-arm robot 500 may sense the end effector 530 in contact with an obstacle or the like using the force detected by the force detector 1. Accordingly, the obstacle avoidance operation, the object damage avoidance operation, etc. that have been difficult by the position control in related art may be easily performed, and the single-arm robot 500 may execute work more safely.

Note that, in the illustrated configuration, the arm 520 has the five arm elements in total, however, the invention is not limited to that. The cases where the arm 520 has a single arm element, two to four arm elements, and six or more arm elements fall within the scope of the invention.

3. Multi-Arm Robot

Next, a multi-arm robot as an embodiment of the robot according to the invention will be explained with reference to FIG. 9.

Figure 9:
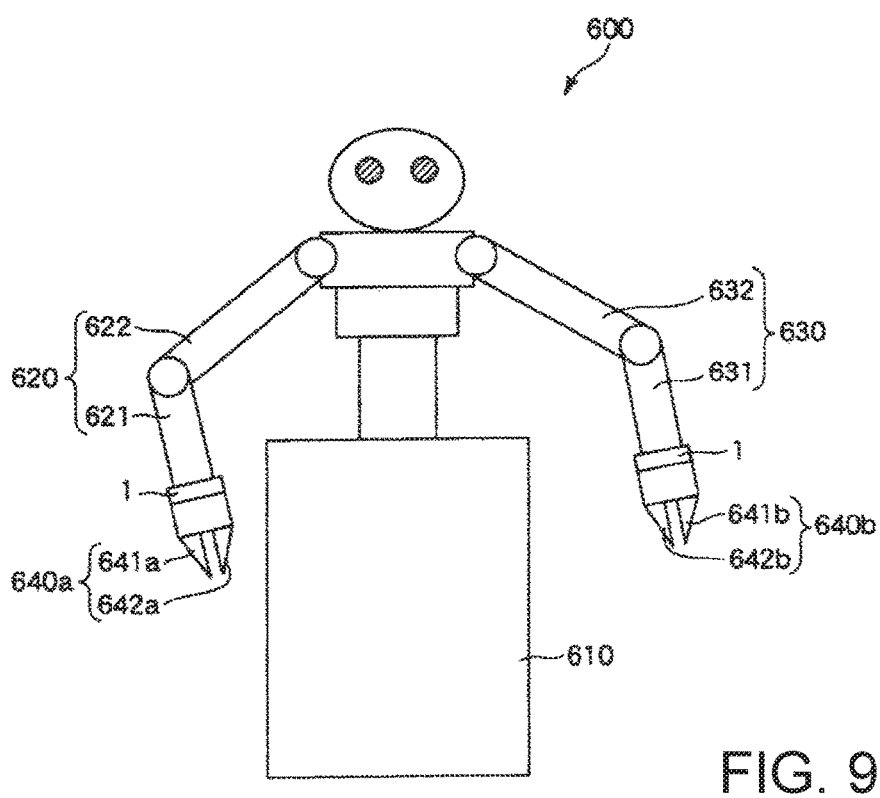
FIG. 9 shows an example of a multi-arm robot using the force detector according to the embodiment of the invention.

FIG. 9 shows an example of the multi-arm robot using the force detector according to the invention. A multi-arm robot 600 in FIG. 9 has a base 610, a first arm 620, a second arm 630, a first end effector 640a provided at the distal end side of the first arm 620, a second end effector 640b provided at the distal end side of the second arm 630, and force detectors 1 provided between the first arm 620 and the first end effector 640a and between the second arm 630 and the second end effector 640b. Note that, as the force detectors 1, the same ones as those in the above described respective embodiments are used.

The base 610 has a function of housing actuators (not shown) that generate power for rotating the first arm 620 and the second arm 630, a control unit (not shown) that controls the actuators, etc. Further, the base 610 is fixed to a floor, a wall, a ceiling, a movable carriage, or the like, for example.

The first arm 620 is formed by rotatably connecting a first arm element 621 and a second arm element 622. The second arm 630 is formed by rotatably connecting a first arm element 631 and a second arm element 632. The first arm 620 and the second arm 630 are driven by composite rotation or bending around the connecting parts of the respective arm elements under control of the control unit.

The first and second end effectors 640a and 640b have functions of grasping objects. The first end effector 640a has a first finger 641a and a second finger 642a. The second end effector 640b has a first finger 641b and a second finger 642b. The first end effector 640a reaches a predetermined operation position by the driving of the first arm 620, then, the separated distance between the first finger 641a and the second finger 642a is adjusted, and thereby, the object may be grasped. Similarly, the second end effector 640b reaches a predetermined operation position by the driving of the second arm. 630, then, the separated distance between the first finger 641b and the second finger 642b is adjusted, and thereby, the object may be grasped.

The force detectors 1 have functions of detecting external forces applied to the first and second end effectors 640a and 640b. The forces detected by the force detectors 1 are fed back to the control unit of the base 610, and thereby, the multi-arm robot 600 may execute work more precisely. Further, the multi-arm robot 600 may sense the first and second end effectors 640a and 640b in contact with an obstacle or the like using the forces detected by the force detectors 1. Accordingly, the obstacle avoidance operation, the object damage avoidance operation, etc. that have been difficult by the position control in related art may be easily performed, and the multi-arm robot 600 may execute work more safely.

Note that, in the illustrated configuration, the two arms are provided in total, however, the invention is not limited to that. The case where the multi-arm robot 600 has three or more arms falls within the scope of the invention.

4. Electronic Component Testing Apparatus and Electronic Component Carrying Apparatus Next, an electronic component testing apparatus and an electronic component carrying apparatus including the force detectors according to the invention will be explained with reference to FIGS. 10 and 11.

Figure 10:
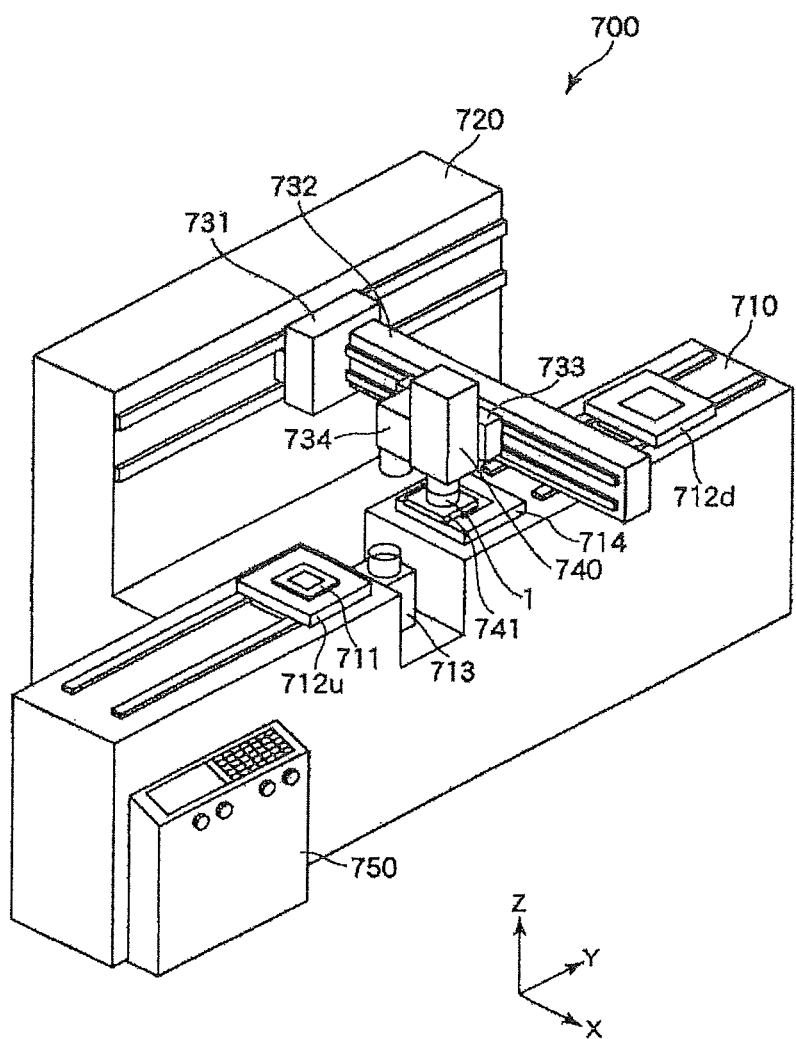
FIG. 10 shows an example of an electronic part inspection apparatus and a part carrying apparatus using the force detector according to the embodiment of the invention.
Figure 11:
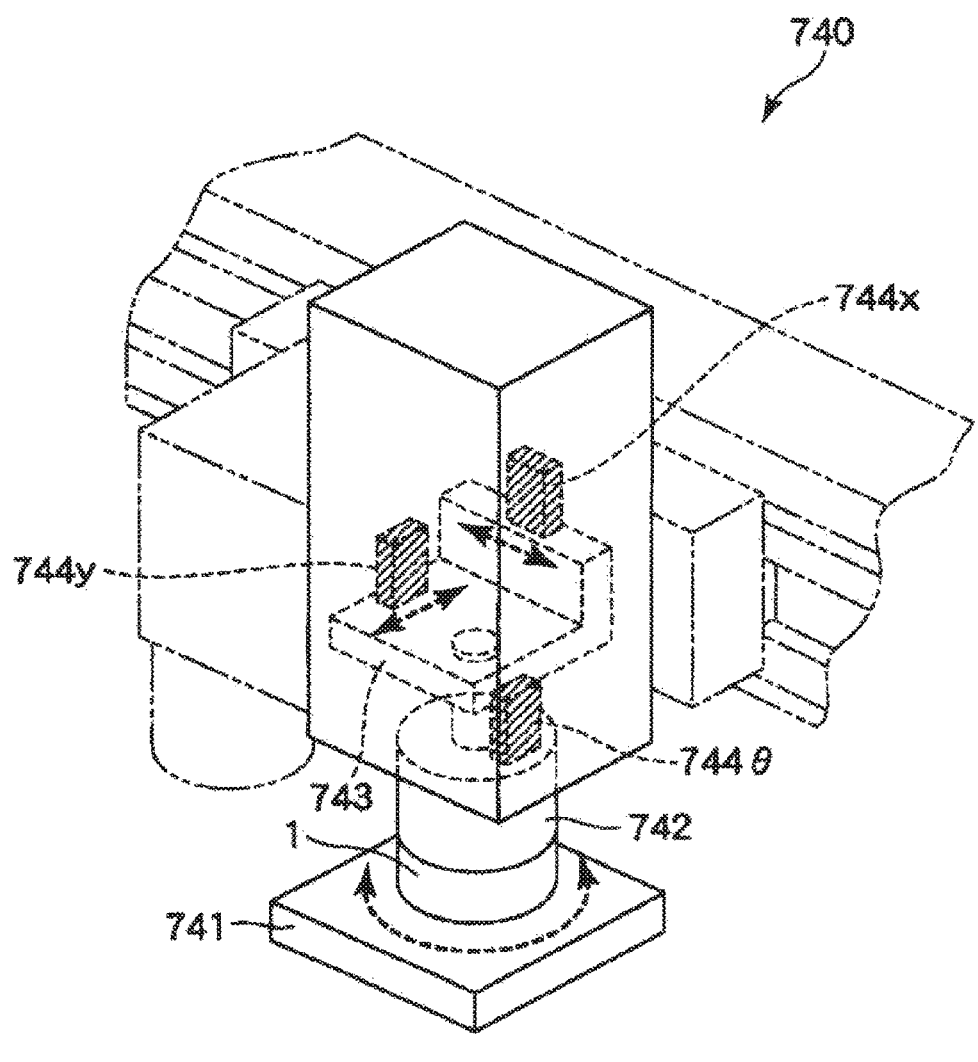
FIG. 11 shows an example of an electronic part carrying apparatus using the force detector according to the embodiment of the invention.

FIG. 10 shows examples of the electronic component testing apparatus and a part carrying apparatus using the force detector according to the invention. FIG. 11 shows an example of the electronic component carrying apparatus using the force detector according to the invention.

An electronic component testing apparatus 700 in FIG. 10 has a base 710 and a support 720 stood on the side surface of the base 710. On the upper surface of the base 710, an upstream-side stage 712u on which an electronic component 711 to be tested is placed and carried and a downstream-side stage 712d on which the electronic component 711 that has been tested is placed and carried are provided. Further, an imaging unit 713 for confirmation of the orientation of the electronic component 711 and a testing bench 714 on which the electronic component 711 is set for testing of electrical characteristics are provided between the upstream-side stage 712u and the downstream-side stage 712d. Note that examples of the electronic component 711 include semiconductors, semiconductor wafers, display devices such as CLD and OLED, crystal devices, various sensors, inkjet heads, various MEMS devices, etc.

On the support 720, a Y-stage 731 is provided movably in a direction (Y-direction) parallel to the upstream-side stage 712u and the downstream-side stage 712d of the base 710 and an arm part 732 is extended from the Y-stage 731 in a direction (X-direction) toward the base 710. Further, an X-stage 733 is provided movably in the X-direct ion on the side surface of the arm part 732. On the X-stage 733, an imaging camera 734 and an electronic component carrying apparatus 740 including a Z-stage movable in vertical directions (Z-directions) are provided. A grasping part 741 that grasps the electronic component 711 is provided at the end side of the electronic component carrying apparatus 740. Furthermore, a force detector 1 is provided between the end of the electronic component carrying apparatus 740 and the grasping part 741. In addition, a control unit 750 that controls the entire operation of the electronic component testing apparatus 700 is provided at the front surface side of the base 710. Note that, as the force detector 1, the same one as the above described respective embodiments is used.

The electronic component testing apparatus 700 performs a test of the electronic component 711 in the following manner. First, the electronic component 711 to be tested is placed on the upstream-side stage 712u and moved close to the testing bench 714. Then, the electronic component carrying apparatus 740 is moved to the position immediately above the electronic component 711 placed on the upstream-side stage 712u by moving the Y-stage 731 and the X-stage 733. In this regard, the position of the electronic component 711 may be confirmed using the imaging camera 734. Then, the electronic component carrying apparatus 740 is moved downward using the Z-stage within the electronic component carrying apparatus 740, the electronic component 711 is grasped by the grasping part 741, and then, the electronic component carrying apparatus 740 is moved to above the imaging unit 713 without change, and the orientation of the electronic component 711 is confirmed using the imaging unit 713. Then, the orientation of the electronic component 711 is adjusted using a fine adjustment mechanism built in the electronic component carrying apparatus 740. Then, the electronic component carrying apparatus 740 is moved onto the testing bench 714, and then, the electronic component 711 is set on the testing bench 714 by moving the Z-stage within the electronic component carrying apparatus 740. The orientation of the electronic component 711 is adjusted using the fine adjustment mechanism within the electronic component carrying apparatus 740, and thereby, the electronic component 711 may be set in a proper position on the testing bench 714. Then, the electrical characteristics test of the electronic component 711 using the testing bench 714 is ended, and then, in turn, the electronic component 711 is removed from the testing bench 714, the electronic component carrying apparatus 740 is moved onto the downstream-side stage 712d by moving the Y-stage 731 and the X-stage 733, and the electronic component 711 is placed on the downstream-side stage 712d. Finally, the downstream-side stage 712d is moved and the electronic component 711 that has been tested is carried to a predetermined position.

FIG. 11 shows the electronic component carrying apparatus 740 including the force detector 1. The electronic component carrying apparatus 740 has the grasping part 741, the six-axial force detector 1 connected to the grasping part 741, a rotation shaft 742 connected to the grasping part 741 via the six-axial force detector 1, and a fine adjustment plate 743 rotatably attached to the rotation shaft 742. The fine adjustment plate 743 is movable in the X-direction and the Y-direction while being guided by a guide mechanism (not shown).

Further, a piezoelectric motor 744θ for rotation direction is mounted to face the end surface of the rotation shaft 742, and a drive convex portion (not shown) of the piezoelectric motor 744θ is pressed against the end surface of the rotation shaft 742. Accordingly, by activation of the piezoelectric motor 744θ, the rotation shaft 742 (and the grasping part 741) can be rotated to an arbitrary angle in the θ-direction. Further, a piezoelectric motor 744x for X-direct ion and a piezoelectric motor 744y for Y-direct ion are provided to face the fine adjustment plate 743, and their drive convex portions (not shown) are pressed against the surface of the fine adjustment plate 743. Accordingly, by activation of the piezoelectric motor 744x, the fine adjustment plate 743 (and the grasping part 741) may be moved to an arbitrary distance in the X-direction, and similarly, by activation of the piezoelectric motor 744y, the fine adjustment plate 743 (and the grasping part 741) may be moved to an arbitrary distance in the Y-direction.

The force detector 1 has a function of detecting an external force applied to the grasping part 741. The force detected by the force detector 1 is fed back to the control unit 750, and thereby, the electronic component carrying apparatus 740 and the electronic component testing apparatus 700 may execute work more precisely. Further, the grasping part 741 in contact with an obstacle or the like may be sensed using the force detected by the force detector 1. Accordingly, the obstacle avoidance operation, the object damage avoidance operation, etc. that have been difficult by the position control in related art may be easily performed, and the electronic component carrying apparatus 740 and the electronic component testing apparatus 700 may execute work more safely.

5. Part Processing Apparatus

Next, an embodiment of a part processing apparatus including the force detector according to the invention will be explained with reference to FIG. 12.

Figure 12:
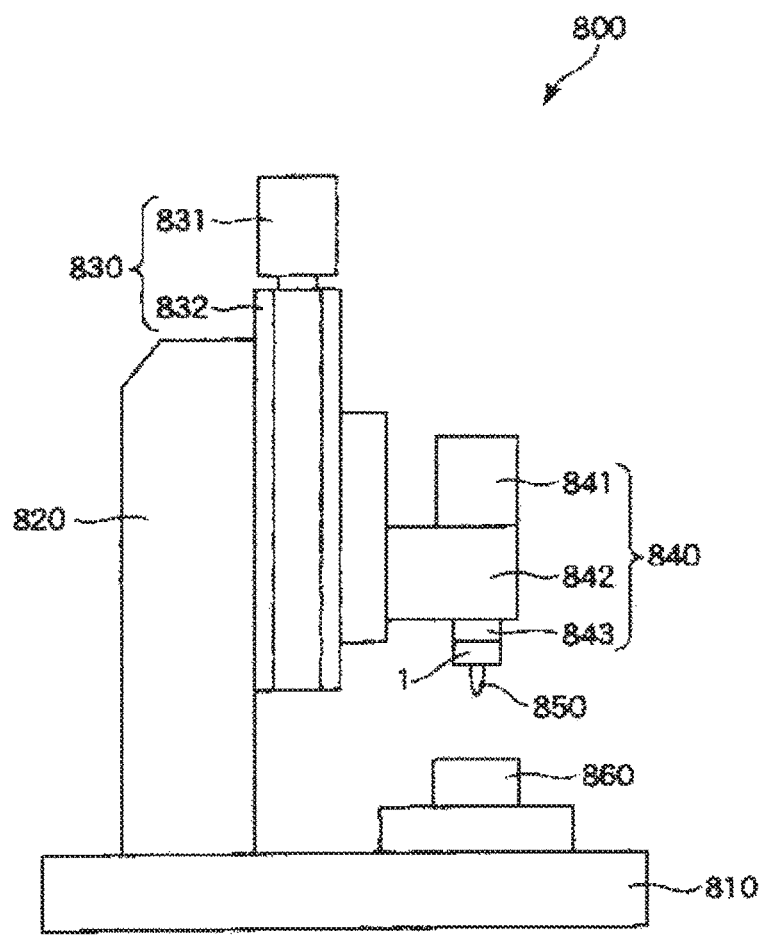
FIG. 12 shows an example of a part machining apparatus using the force detector according to the embodiment of the invention.

FIG. 12 shows an example according to the part processing apparatus using the force detector according to the invention. A part processing apparatus 800 in FIG. 12 has a base 810, a support 820 stood on the upper surface of the base 810, a feed mechanism 830 provided on the side surface of the support 820, a tool displacement unit 840 attached to the feed mechanism 830 so as to move up and down, the force detector 1 connected to the tool displacement unit 840, and a tool 850 attached to the tool displacement unit 840 via the force detector 1. Note that, as the force detector 1, the same one as those in the respective embodiments is used.

The base 810 is a bench for mounting and fixing a processed part 860. The support 820 is a column for fixing the feed mechanism 830. The feed mechanism 830 has a function of moving up and down the tool displacement unit 840. The feed mechanism 830 has a feed motor 831, and a guide 832 that moves up and down the tool displacement unit 840 based on the output from the feed motor 831. The tool displacement unit 840 has a function of causing displacement including rotation and vibration of the tool 850. The tool displacement unit 840 has a displacement motor 841, a tool attachment part 843 provided at the end of the main shaft (not shown) connected to the displacement motor 841, and a holding part 842 attached to the tool displacement unit 840 and holding the main shaft. The tool 850 is attached to the tool attachment part 843 of the tool displacement unit 840 via the force detector 1 and used for processing the processed part 860 in response to the displacement caused by the tool displacement unit 840. The tool 850 is not particularly limited, however, e.g., a wrench, across slot screwdriver, a straight slot screwdriver, a cutter, a circular saw, a nipper, a borer, a drill, a milling cutter, or the like.

The force detector 1 has a function of detecting an external force applied to the tool 850. The external force detected by the force detector 1 is fed back to the feed motor 831 and the displacement motor 841, and thereby, the part processing apparatus 800 may execute part processing work more precisely. Further, the tool 850 in contact with an obstacle or the like may be sensed using the external force detected by the force detector 1. Accordingly, when an obstacle or the like is brought into contact with the tool 850, emergency stop may be executed, and the part processing apparatus 800 may execute safer part processing work.

The force detector and the robot according to the invention have been explained according to the illustrated embodiments, however, the invention is not limited to those and the configurations of the respective parts forming the force detector and the robot may be replaced by any configurations having the same functions. Further, any other configurations may be added to the embodiments.

In addition, the force detector and the robot according to the invention may be combinations of any two or more configurations (features) of the above described respective embodiments.

Further, in the force detector according to the invention, the four charge output elements are provided, however, the number of charge output elements is not limited to that. For example, the number of charge output elements may be one, two, three, or five or more.

Furthermore, in the invention, in place of the pressurization bolts, bolts not having the function of pressurizing the elements may be used, and a securing method using other than bolts may be employed.

The robot according to the invention is not limited to the armed robot (robot arm), but may be another type of robot including a scalar robot, a legged walking (running) robot, or the like, for example, as long as the robot has an arm.

In addition, the force detector according to the invention may be applied, not limited to the robot, the electronic component carrying apparatus, the electronic component testing apparatus, and the part processing apparatus, but to other apparatuses including other carrying apparatuses, other testing apparatuses, vehicles such as automobiles, motorbikes, airplanes, ships, and trains, mobile units such as biped walking robots and wheel moving robots, measurement devices such as vibration meters, acceleration meters, gravity meters, dynamometers, seismometers, and inclinometers, input devices, etc.

What is claimed is:

1. A force detector comprising:
   a first base;
   a second base; and
   first through fourth pressure detection sensors, each of the first through fourth pressure detection sensors being provided between the first base and the second base, and each of the first through fourth pressure detection sensors including a piezoelectric element which outputs a first signal in response to an external force,
   wherein each of the first base and the first through fourth pressure detection sensors are in direct contact with a different plane,
   the piezoelectric element includes a first sensor having a first detection plate and a first output electrode layer,
   the first detection plate is formed by a first Y-cut crystal plate having a first x-axis, a first y-axis, and a first z-axis orthogonal to one another, the first y-axis extending along a thickness direction of the first sensor, the first x-axis extending along a lateral direction of the first sensor, and the first z-axis extending along a longitudinal direction of the first sensor, and
   when the external force has a first force component parallel to the first x-axis, the force detector detects the first force component parallel to the first x-axis of the first Y-cut crystal plate.

2. The force detector according to claim 1,
   wherein the first sensor includes a second detection plate separated from the first detection plate by the first output electrode layer,
   the second detection plate is formed by a second Y-cut crystal plate having a second x-axis, a second y-axis, and a second z-axis orthogonal to one another, the second y-axis extending along the thickness direction of the first sensor, the second x-axis extending along the lateral direction of the first sensor, and the second z-axis extending along the longitudinal direction of the first sensor, and
   when the external force has the first force component parallel to the second x-axis, the force detector detects the first force component parallel to the second x-axis of the second Y-cut crystal plate.

3. The force detector according to claim 1,
   wherein the piezoelectric element includes a second sensor having a third detection plate and a second output electrode layer,
   the third detection plate is formed by a third Y-cut crystal plate having a third x-axis, a third y-axis, and a third z-axis orthogonal to one another, the third y-axis extending along a thickness direction of the second sensor, the third x-axis extending along a lateral direction of the second sensor, and the third z-axis extending along a longitudinal direction of the second sensor, and
   when the external force has a second force component parallel to the third x-axis, the force detector detects the second force component parallel to the third x-axis of the third Y-cut crystal plate.

4. The force detector according to claim 2,
   wherein the piezoelectric element includes a second sensor having a third detection plate and a second output electrode layer,
   the third detection plate is formed by a third Y-cut crystal plate having a third x-axis, a third y-axis, and a third z-axis orthogonal to one another, the third y-axis extending along a thickness direction of the second sensor, the third x-axis extending along a lateral direction of the second sensor, and the third z-axis extending along a longitudinal direction of the second sensor, and
   when the external force has a second force component parallel to the third x-axis, the force detector detects the second force component parallel to the third x-axis of the third Y-cut crystal plate.

5. The force detector according to claim 1, wherein the external force is a shear force such that the piezoelectric element outputs the signal in response to the shear force which has the first force component parallel to the first x-axis of the first Y-cut crystal plate.

6. The force detector according to claim 2,
   wherein the external force is a shear force such that the piezoelectric element outputs the signal in response to the shear force which has the first force component parallel to the first x-axis of the first Y-cut crystal plate.

7. The force detector according to claim 3,
   wherein the external force is a shear force such that the piezoelectric element outputs the signal in response to the shear force which has the first force component parallel to the first x-axis of the first Y-cut crystal plate.

8. The force detector according to claim 2,
   wherein the external force is a shear force such that the piezoelectric element outputs the signal in response to the shear force which has the first force component parallel to the second x-axis of the second Y-cut crystal plate.

9. The force detector according to claim 4,
   wherein the external force is a shear force such that the piezoelectric element outputs the signal in response to the shear force which has the first force component parallel to the third x-axis of the second Y-cut crystal plate.

10. The force detector according to claim 1,
wherein each of the first through fourth pressure detection sensors includes a circuit board,
the circuit board is located between the first base and the second base, and
the circuit board has a through hole through which a convex portion of the first base physically contacts the pressure detection sensor.

11. The force detector according to claim 2,
wherein each of the first through fourth pressure detection sensors includes a circuit board,
the circuit board is located between the first base and the second base, and
the circuit board has a through hole through which a convex portion of the first base physically contacts the pressure detection sensor.

12. The force detector according to claim 3,
wherein each of the first through fourth pressure detection sensors includes a circuit board,
the circuit board is located between the first base and the second base, and
the circuit board has a through hole through which a convex portion of the first base physically contacts the pressure detection sensor.

13. The force detector according to claim 1,
wherein each of the first through fourth pressure detection sensors is fixed between the first base and the second base by a pressurization fixing member, and
a pressurization of the piezoelectric element is adjusted by the pressurization fixing member.

14. The force detector according to claim 2,
wherein each of the first through fourth pressure detection sensors is fixed between the first base and the second base by a pressurization fixing member, and
a pressurization of the piezoelectric element is adjusted by the pressurization fixing member.

15. The force detector according to claim 3,
wherein each of the first through fourth pressure detection sensors is fixed between the first base and the second base by a pressurization fixing member, and
a pressurization of the piezoelectric element is adjusted by the pressurization fixing member.

16. A robot comprising:
an arm;
an end effector provided on the arm; and
the force detector according to claim 6 provided between the arm and the end effector and detecting the external force applied to the end effector.

17. A robot comprising:
an arm;
an end effector provided on the arm; and
the force detector according to claim 1 provided between the arm and the end effector and detecting the external force applied to the end effector.

18. A robot comprising:
an arm;
an end effector provided on the arm; and
the force detector according to claim 2 provided between the arm and the end effector and detecting the external force applied to the end effector.

19. A robot comprising:
an arm;
an end effector provided on the arm; and
the force detector according to claim 3 provided between the arm and the end effector and detecting the external force applied to the end effector.

20. A robot comprising:
an arm;
an end effector provided on the arm; and
the force detector according to claim 4 provided between the arm and the end effector and detecting the external force applied to the end effector.

21. A robot comprising:
an arm;
an end effector provided on the arm; and
the force detector according to claim 5 provided between the arm and the end effector and detecting the external force applied to the end effector.

* * * * *